United States Patent
Szwabe

(10) Patent No.: US 12,032,919 B1
(45) Date of Patent: Jul. 9, 2024

(54) POST-CALIBRATION OF LARGE LANGUAGE MODEL CONFIDENCE SCORING VIA COMBINED TECHNIQUES

(71) Applicant: Snowflake Inc., Bozeman, MT (US)

(72) Inventor: Andrzej Szwabe, Poznan (PL)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/450,700

(22) Filed: Aug. 16, 2023

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC .............................. G06F 40/40; G06F 40/284
USPC ............................................................. 704/9
See application file for complete search history.

(56) References Cited

U.S. PATENT DOCUMENTS

| | | | |
|---|---|---|---|
| 2012/0109652 A1* | 5/2012 | Levit | G10L 15/01 704/E15.001 |
| 2022/0351088 A1* | 11/2022 | Kumar | G06N 7/01 |

OTHER PUBLICATIONS

Desai, Shrey, "Calibration of Pre-trained Transformers", arXiv:2003.07892v3 [cs.CL], (Oct. 15, 2020), 8 pages.
Jiang, Zhengbao, "How Can We Know What Language Models Know", arXiv:1911.12543v2 [cs. CL], (May 3, 2020), 16 pages.
Kadavath, Saurav, "Language Models (Mostly) Know What They Know", arXiv:2207.05221v4 [cs. CL], (Nov. 21, 2022), 43 pages.
Openai, "GPT-4", [Online]. Retrieved from the Internet: https:openai.com research gpt-4, (Accessed online Jan. 25, 2024), 31 pages.
Saha, Amrita, "DuoRC: Towards Complex Language Understanding with Paraphrased Reading Comprehension", arXiv:1804.07927v4 [cs.CL], (Oct. 10, 2018), 16 pages.
Si, Chenglei, "Prompting GPT-3 to be Reliable", arXiv:2210.09150v2 [cs.CL] Feb. 2, 2015, (Feb. 15, 2023), 24 pages.
Ye, Xi, "Can Explanations Be Useful for Calibrating Black Box Models", arXiv:2110.07586v2 [cs. CL], (Mar. 15, 2022), 14 pages.

* cited by examiner

*Primary Examiner* — Thierry L Pham
(74) *Attorney, Agent, or Firm* — Schwegman Lundberg & Woessner, P.A.

(57) ABSTRACT

Examples provide a large language model confidence scoring post-calibration based on a combination of temperature scaling, softmax denominator top-k probabilities selection, and polynomial regression. A secure machine learning system receives results generated by a machine learning (ML) model, the results including at least one confidence score. The secure ML system identifies at least one challenge in accuracy of the results generated by the ML model configured to perform document processing and understanding. The secure machine learning system implements confidence scoring recalibration to address at least one challenge, the confidence scoring recalibration including functionality to assess reliability of the results generated by the ML model, and applies post-processing calibration to the at least one confidence score generated by the confidence scoring recalibration to enhance performance of the ML model, the post-processing calibration including adjusting the at least one confidence score generated by the confidence scoring recalibration.

30 Claims, 15 Drawing Sheets

POST-CALIBRATION OF LARGE LANGUAGE MODEL CONFIDENCE SCORING VIA COMBINED TECHNIQUES

TECHNICAL FIELD

The present disclosure generally relates to special-purpose machines that manage data platforms and databases incorporating Large Language Models (LLMs) and, more specifically, to data platforms that provide LLM confidence scoring post-calibration based on a combination of techniques.

BACKGROUND

Data platforms may be provided through a cloud data platform, which allows organizations, customers, and users to store, manage, analyze, and retrieve data from the cloud. With respect to a type of data processing, a cloud data platform can implement online transactional processing, online analytical processing, a combination of the two, and/or other types of data processing, including machine-learning (ML) models used for prediction analysis and document understanding using large language models (LLMs).

Users employ various types of electronic documents (also referred to herein as "documents") including, for example, scanned handwritten documents, scanned forms, large documents (e.g., reports), word processing documents (e.g., DOCX documents), postscript documents (e.g., PDF documents), and the like. Additionally, documents can sometimes be in the form of images (e.g., pictures of pages). A given user may want to process these and other document types and use a document process, such as an ML model-based process, to extract data points from documents to allow for document understanding. For instance, a user can setup a document processing pipeline that is configured to ingest (e.g., continuously running) multiple documents of various types (e.g., images, writing, pictures, drawings, etc.), and process each of the documents using one or more ML models to extract data points of interest to the given user.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
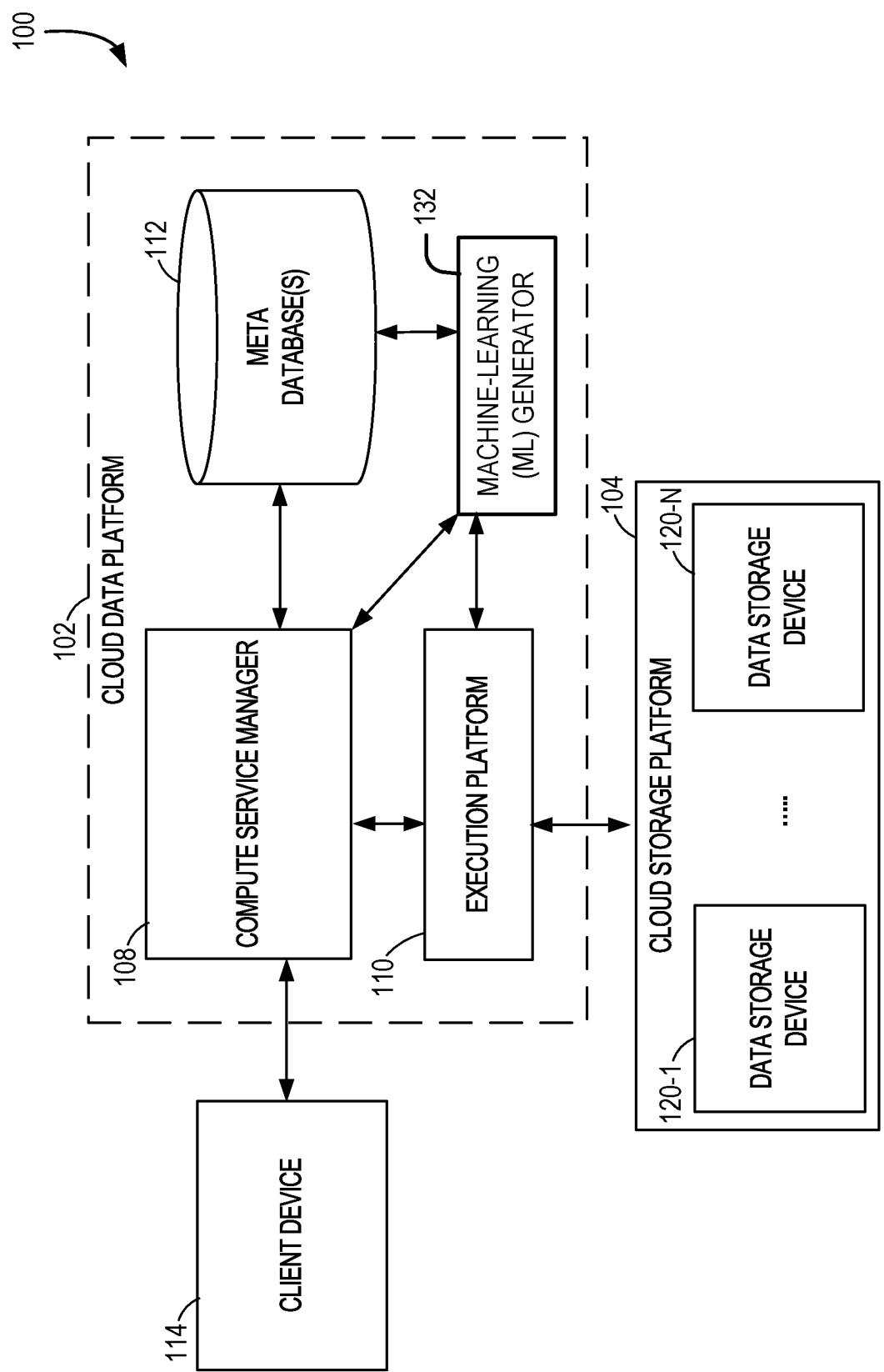
FIG. 1 illustrates an example computing environment in which a cloud data platform, in communication with a cloud storage platform, can implement a large language model (LLM), according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. For the purposes of this description, the phrase "cloud data platform" may be referred to as and used interchangeably with the phrases "a network-based database system," "a database system," or merely "a platform."

Generally, machine learning (ML) models are not guaranteed to generate accurate and/or quality results, and, in the context of document processing or understanding, this can result in inaccurate data extraction, incorrect understanding, improper calibration, and more. To mitigate and address this issue, users who desire a high-level of accuracy during document data extraction can use varying confidence scoring models. Unfortunately, when processing large amounts of documents (e.g., large language models, generative AI, etc.), during continuous document processing, during document understanding, or the like, improving confidence scores is constrained by a trade-off that may consequently exemplify in a decrease of calibration quality or a decrease of a selective prediction accuracy.

Document understanding in machine learning can refer to the process of extracting meaningful information from documents. Document understanding involves extracting and interpreting information from text documents. This can include several tasks such as: text classification (categorizing documents into predefined classes), named entity recognition (NER) (identifying and classifying named entities in the text), sentiment analysis (determining the sentiment expressed in the text), topic modeling (identifying the main topics that the document discusses), information extraction (extracting structured information from unstructured text), text summarization (creating a short summary that captures the main points of the document), question answering (providing answers to questions based on the information in the document), or the like. Document understanding is crucial in many applications, such as search engines, chatbots, content recommendation, generative Artificial Intelligence (AI), ML models, and more. Currently the most advanced document understanding requires using specialized Large Language Models (LLMs) for visually-aware question answering.

In document understanding, a confidence score can be generated (e.g., computed) at or after the point of making predictions or classifications based on the information extracted from the documents. For example, after processing and understanding a document, an ML model can make predictions or classifications based on the extracted information. For each prediction or classification, the model can also provide a confidence score. This score indicates how certain the model is about its prediction or classification. For example, in a sentiment analysis task, a model might predict that a given text document expresses a positive sentiment with a confidence score of 0.85. This means the model is 85% sure that the sentiment of the text is positive. These confidence scores can be particularly useful in practice. They can help in decision-making processes, in evaluating and comparing different models, and in understanding the model's behavior. They can also be used in post-processing steps, such as calibration, to make the model's predictive quality more reliable. According to some example embodiments, an important application of confidence scores is selective prediction in which the model selects the subset of the most confident predictions, including having confidence scores above a specified threshold value. In many document understanding use cases the least confident predictions are forwarded to human annotators. Therefore, it is important to be able to estimate the model predictions accuracy that the customer/user may expect when they set up the confidence score threshold. Low confidence scoring calibration error corresponds to good alignment of the value of the confidence score threshold and the accuracy of the predictions.

Confidence scoring can refer to the probability that a given prediction or classification is correct. For example, confidence scoring can be a measure of the certainty or probability that a given prediction or classification made by a model is correct. Confidence scoring can include a measure of certainty associated with the output of a model (e.g., a machine learning model, a large language model, etc.). For example, in a binary classification problem, a model can predict that a given document expresses a positive sentiment and assign a confidence score to this prediction. If the confidence score is 0.9, it means the model is 90% sure that the document expresses a positive sentiment. Confidence scores can be useful in many ways. They can help in decision-making processes where not only the prediction but also the certainty of the prediction is important. Confidence scores can also be used to rank predictions, prioritize resources, or in post-processing steps like calibration.

Post-processing of confidence scores for their recalibration can refer to the process of adjusting the confidence scores—originally the output probabilities of a predictive model—after they have been generated. One goal is to ensure that the scores accurately reflect the true likelihood of the outcomes. For example, a well-calibrated binary classifier can output probabilities that can be interpreted as the actual chance of a given instance belonging to the positive class. Using the sentiment analysis example above, if the model predicts an instance with a 0.7 probability, then instances with that prediction should actually be positive 70% of the time (e.g., the document expresses a positive sentiment). Calibration can be important in many applications, such as where reliable probability estimates are needed, such as document understanding, risk modeling, medical diagnosis, and the like.

Confidence scoring post-calibration can refer to the confidence scores assigned to predictions after they have been generated by the model. For example, in machine learning, a model makes predictions and assigns a confidence score to each prediction (e.g., a measure of the model's certainty about that prediction). However, these confidence scores may not always accurately reflect the true probabilities of the predictions being true. Post-calibration is a process that can adjust these confidence scores to make them more reliable (e.g., dependable) and interpretable in terms of accuracy of the corresponding predictions. After calibration, the confidence scores should better represent the actual likelihood of each prediction being correct. For example, if a calibrated model gives a confidence score of 0.8 to a prediction of the document expressing a positive sentiment, it means that out of every 100 predictions with this confidence score, it is expected that about 80 of the predictions are correctly identified as positive. This makes the confidence scores more meaningful (e.g., significant, profound, expressive, etc.) and useful (e.g., convenient, beneficial, etc.) in one or more decision-making processes. Confidence scoring post-calibration can be a crucial step in refining the outputs of a machine learning model by helping to improve the reliability and interpretability of the model's predictions.

In many machine learning applications, models provide not only a prediction but also a confidence score or probability associated with each prediction. These scores can be used to rank the predictions from most to least confident. Selective prediction accuracy refers to the accuracy of a model's predictions when considering only a subset of the predictions where the model is most confident. Selective prediction accuracy can then be calculated by considering only the top predictions up to a certain confidence level or percentage of the total. For example, one might calculate the accuracy of the top 10% most confident predictions, or all predictions with a confidence score above a certain threshold. The selective prediction accuracy measurement can be useful in scenarios where it is more important to be correct (e.g., more accurate) on a smaller number of high-confidence predictions than to make predictions on all instances. For example, in document understanding, it might be preferable to make fewer predictions but have a high accuracy on those predictions, rather than making predictions for all documents but with a lower overall accuracy.

Current technologies fail to consider confidence scores post-processing as aimed at more than just confidence score recalibration: they neglect the perspective of selective predictive accuracy and the need for evaluation of confidence scores from both the perspectives: calibration and selective prediction accuracy. They are also not capable of improving the quality of confidence scoring for LLMs in a computationally inexpensive manner.

Example embodiments of the present disclosure improve upon existing techniques and overcome current technical challenges by providing for systems, methods, devices, instructions, and the like for generating a machine-learning (ML) or artificial intelligence (AI) model for improving both calibration and selective prediction accuracy based on a combination of temperature scaling (sometimes in the form of intentional miscalibration), softmax denominator top-k probabilities selection, and polynomial regression, referred to herein as a "Post-Hoc Calibration (PHC) Solution Set." The PHC Solution Set incorporates post-calibration functions that constitute a sequence of data processing functions and/or data aggregation functions of different input and output data types for a variety of purposes (e.g., use cases). The PHC Solution Set incorporates the temperature scaling function to process a sequence of per-token logits vectors into another sequence of per-token logits vectors.

Temperature scaling is a method used to calibrate the confidence scores (or probabilities) output by an ML model, such as a neural network. The goal of temperature scaling is to adjust these scores so that the scores better reflect the true probabilities of each prediction. In temperature scaling, a single parameter, often referred to as a "temperature," is learned on a validation set (e.g., validation set is a subset of the dataset that is used during the training of the ML model). This parameter can be used to adjust the logits at the output of the core of the model. The softmax function is commonly used in ML to convert a vector of real numbers into a probability distribution. The temperature parameter adjusts the "sharpness" of this distribution. For example, a high temperature makes the distribution more uniform (e.g., less confident), while a low temperature makes it more concentrated on a few outcomes (e.g., more confident). By learning the optimal temperature on a validation set, the model's confidence scores can be adjusted to better match the true probabilities. This can be particularly useful in scenarios where well-calibrated probabilities are important and cannot be recalibrated at some post-processing step, such as in document understanding, risk modeling, medical diagnosis, or the like.

The PHC Solution Set further incorporates a top-k softmax denomination function to process a sequence of per-token logits vectors to be used to compute the softmax function denominator (e.g., at the next step of softmax function application proving per-token probabilities) into another sequence (e.g., typically modified) of per-token logits vectors to be used to compute the softmax function denominator. The term "top-k softmax" refers to a variation of the softmax function used in machine learning, particularly in classification tasks. While the softmax function is used to convert a vector of real numbers into a probability distribution, the "top-k" component refers to considering only the top k elements according to their probabilities. In other words, the k largest probabilities are selected from the output of the softmax function. These selected probabilities are then renormalized to sum to 1, forming a new probability distribution. Last, the PHC Solution Set combines the temperature scaling function and a top-k softmax denomination function with a regression-based post-hoc calibration function to process a single number, being the result of some aggregation of per-token probabilities (e.g., such as aggregation based on geometric mean, mean, or the like) into a preliminary (e.g., not re-calibrated; sometimes even intentionally miscalibrated) confidence score, and finally, into a single number being the final, re-calibrated confidence score. A regression-based post-hoc calibration function is a method used to adjust the output of an ML model after it has been generated (in the process of the output prediction generation). One goal of regression-based post-hoc calibration is to make the model's confidence scores more accurate and reliable. In the context of machine learning, "post-hoc" refers to adjustments or analyses that are performed after the model has been trained. "Calibration" refers to the process of adjusting the model's predictions to better align with reality. A regression-based post-hoc calibration function works by fitting a regression model to the model's predictions and the true outcomes (e.g., reality). This regression model learns the relationship between the model's predictions and the true outcomes and can then be used to adjust the model's future confidence scores. For example, if a model consistently overestimates the probability of a certain outcome, a regression-based post-hoc calibration function can learn this and adjust the model's future predictions downward. This method can be particularly useful in scenarios where the model's predictions are used to make important decisions, and it is crucial that these predictions are as reliable as possible.

A regression-based post-hoc calibration function may map a single number to a single number. In such a case, the PHC Solution Set regressor is one-dimensional. In consequence, such a computationally inexpensive (e.g., cheap) way of confidence score recalibration may be easily enforced (e.g., ensured) to be monotonic (a function is said to be monotonic if it either entirely increases or decreases). In the special case of polynomial regression, this monotonicity can be verified with full certainty at a low computational cost by means of a standard differential calculus (e.g., polynomial derivative roots inspection) procedure. The use of polynomial regression as a basis for regression-based post-hoc calibration is novel.

Traditional approaches address this problem through prior solutions—including existing state-of-the-art regression-based LLM post-hoc calibration methods based on gradient-boosted tree regression (often referred to as "feature-based forecasters"). However, existing post-hoc calibration methods that are based on gradient-boosted tree regression or any other regression not being one-dimensional, cannot guarantee the unique properties that may be guaranteed when low-degree one-dimensional polynomial regression is used as presented in example embodiments of the present disclosure related to important unique properties of one-dimensional, low-degree polynomial regression used for regression-based post-hoc calibration.

Moreover, as far as inference computation cost is concerned, the existing regression-based LLM post-hoc calibration methods are more expensive (e.g., methods based on gradient-boosted tree regression and methods based on multiple answers and prediction sampling, like Self-Contrastive (SelfCon) Learning). Furthermore, temperature scaling and regression-based post-hoc calibration are the only computationally efficient and functionally effective (e.g., capable of introducing a significant improvement of selective prediction quality and/or calibration quality) methods proposed and advocated by more than just one independent group of researchers. Nevertheless, so far, no combination of temperature scaling and regression based PHC methods has been proposed that enables improving selective prediction quality and calibration quality at the same time.

The problems related to confidence score calibration are challenging for even the leading artificial intelligence/machine learning (AI/ML) market players. In other words, all the existing solutions can provide selective prediction quality improvement at the "cost" of calibration degradation or calibration improvement at the "cost" of selective prediction quality degradation. Moreover, existing methods and approaches to confidence scoring and prediction in LLM output fail to successfully calibrate confidence scores, leading even the strongest existing LLMs to provide output that is prone to LLM hallucinations (e.g., instances where the model generates or predicts information that is not present in the input data). For example, certain LLMs either are not concerned about using the estimated probability of being correct or cannot estimate this probability well enough, causing LLM hallucinations. Such low quality of confidence scores hurts document understanding performance, especially in the challenging zero-shot scenario example (a zero-shot scenario refers to a situation where an ML model is asked to make predictions on a type of data that it has not seen during training). No existing solutions enable improving accuracy for some fraction of the most confident LLM answers (e.g., improving accuracy in a selective prediction application scenario) without compromising calibration, or improving calibration (e.g., reducing calibration error) without compromising accuracy for some fraction of the most confident LLM answers.

Existing methods fail to overcome the technical challenges related to determining if an LLM has produced a prediction that is confident enough. The combination of functions described in the present disclosure have not been considered in prior existing solutions because many data scientists consider that confidence scores are solely about calibrating those scores. However, there have been no attempts at multi-faceted solutions of confidence scoring including a first facet that considers selective prediction performance that is dependent only on different ways of sorting confidence scores (e.g., least confident to most confident, and vice versa). In addition, the second facet includes a separate (e.g., distinct) task of predicting (e.g., guessing) what is the probability of the given prediction being correct.

Example embodiments of the present disclosure overcome the technical difficulties of prior solutions by providing a unique combination (e.g., a sequence) of two complementary techniques referred to herein as "temperature scaling" and "regression-based post-hoc calibration." The temperature scaling technique is used in example embodiments in a different way than it is used in prior existing methods. Specifically, temperature scaling is used herein to improve selective prediction accuracy rather than to improve calibration; for example, sometimes even deliberately radically increasing calibration error, which goes against and performs in clear contrast to all the existing solutions. The regression-based post-hoc calibration technique is used in example embodiments to compensate for calibration error either not mitigated at the temperature scaling step or deliberately increased at the temperature scaling step (e.g., in clear contrast to existing solutions). In addition, top-k softmax denomination plays a secondary role as an optional element of the solution to provide an impact on the outcome.

For example, using the confidence scores presented in example embodiments of the present disclosure enable better self-awareness of large language models using an innovative solution that make each of the models to significantly know when it is right (e.g., to increase its selective prediction accuracy) and what is the probability that it is right (e.g., to improve its calibration). The instant solution can be applied to any generative LLM, such as document understanding LLMs, AutoSQL LLMs, and the like. The instant solution is an innovative combination of solutions previously only applied individually, as well as currently being applied in different ways.

Example embodiments of the present disclosure ensure uniquely low computational cost of the new solution as a result of combining two computationally inexpensive (e.g., cheap) methods referred to herein as "temperature scaling" and "regression-based post-hoc calibration." For example, computationally inexpensive methods can include algorithms or processes that require relatively low computational resources to execute, where resources can include processing power, memory, time, or combinations thereof. Generally, if a process is computationally inexpensive, it can be executed quickly and without significantly impacting the performance of computer systems and/or the cloud data platform. Example embodiments provide for improvements over existing techniques by combining multiple computationally inexpensive processes to provide for post-calibration confidence scoring in large language models. This is particularly important in the fields of machine learning and artificial intelligence, specifically in regard to large language models, where complex algorithms used individually can require significant computational power, which slow down the system or make the process impractical for certain applications, like LLMs.

Example embodiments of the present disclosure include multiple advantages previously undiscovered, including for example, one key property of the PHC Solution Set being the ability to improve confidence scores, while this improvement is seen from two perspectives that so far were at least to some extent, in a trade-off relation. In clear contrast to the existing solutions, the example embodiments provided herein can improve both selective prediction quality and calibration as a result of join application of the three techniques that constitute the PHC Solution Set. In general, the problem addressed by the new solution (e.g., PHC Solution Set) is the improvement of the quality of confidence scoring for Large Language Models (LLMs) and additional types of deep learning models or machine learning models in general. The PHC Solution Set provided by the instant disclosure can be applied to any LLM (e.g., AutoSQL, Document Understanding, etc.).

Example embodiments of the present disclosure are directed to systems, methods, machine-readable mediums, devices, instructions, and the like for improved confidence scoring models in document understanding systems. More specifically, examples of the present disclosure provide for large language model (LLM) confidence scoring post-calibration employing a combination of temperature scaling, softmax denominator top-k probabilities selection, and polynomial regression to be used, for example, in document understanding, AutoSQL, and the like. To resolve existing technical problems, example embodiments of a cloud data platform can employ and enable fine-tuned models to provide a rich user experience to use the fine-tuned models to extract information from structured and unstructured documents. Example embodiments of the present disclosure include a cloud data platform operatively integrated with an LLM service to create and provide a fine-tuned machine-learning model from a zero-shot base model to extract information from data files. Example embodiments overcome existing technical problems by providing an effective reduction of calibration error to generate a best outcome, while simultaneously improving selective prediction accuracy.

Example embodiments of an LLM as used herein are understood in the most widespread way (e.g., as any transformer-architecture model such as text-image-layout transformer (TILT) language models being the core of the cloud data platform document understanding, Text-to-Text Transfer Transformer (T5), Generative Pre-Trained Transformers (GPT), and other generative artificial intelligence (AI) applications). Using the LLM described herein, raw predictions can include a sequence of per-token logits transformed (e.g., using a softmax-based function or the like) to the corresponding sequence of per-token probabilities, being the input data for an aggregation function (e.g., geometric mean, etc.), post-calibration function, or some combination thereof. Finally, providing a single confidence score value for the whole sequence of generated (e.g., predicted) model output tokens. Confidence scoring post-calibration is understood as a function, or set or sequence of functions, individually or jointly processing a sequence of per-token logits into the final single-number confidence score (e.g., attributed to the generated LLM prediction and/or answer).

In the context of large language models, and as used herein, a sequence of per-token logits includes a series of numerical values, in the form of algebraic vectors, which represent a model's prediction(s) for each token in a sequence representing the predicted text. Logits include the raw, unnormalized output of a neural network prior to the application of a softmax function that is used to convert the logits into probabilities. For example, the logits can provide a measurement of a model's confidence score (e.g., a belief in each possible token at each position in a sequence) and, after conversion to probabilities, are used in additional machine-learning or application tasks, such as translation, classification, generation, and the like used to convert an ML model output into useful (e.g., understandable, expressive, actually appearing in a scanned document, etc.) text.

In some example embodiments, individual elements of information that are targeted for extraction from an electronic document can be referred to as data points, and the extracted values for those data points can be referred to as data point values. For some embodiments, data points extracted from electronic documents are stored into a table (e.g., of a cloud data platform), such as a database table, where extracted values for the data points can be stored in columns of the table according to data point-to-column mapping. As used herein, an electronic document can comprise a file. Use of various embodiments can, for example, provide for a new confidence score solution that improves both calibration and selective prediction accuracy of electronic documents. In some examples, where certain electronic documents, when processed by an ML model for extraction of one or more data points, result in the ML model providing (e.g., indicating) confidence scores for one or more data point values extracted.

As used herein, a provider is an organization, company, or account (e.g., provider user) that owns and hosts a database or a set of data within the cloud data platform, the provider can be responsible for making the data available to other accounts or consumers for sharing and analysis such as sharing specific databases, schemas, relations, or the like with other accounts. As used herein, a consumer is an organization, company, or account (e.g., consumer user) that accesses and consumes data shared by the provider, where consumers can access and query the shared data without the need for data replication or data movement. Consumers can further combine the shared data with their own data within the cloud data platform to perform various analytical operations on the data.

To summarize the advantages over prior existing solutions, the example embodiments presented in the present disclosure provide a new solution that improves selective prediction accuracy by a couple of tens of percentage points, depending on the example embodiment, while simultaneously reducing calibration error by up to a factor of four of a generative large language model. In contrast to existing solutions that can improve only the selective prediction accuracy or only the calibration, or only improve calibration while decreasing selective prediction accuracy.

FIG. 1 illustrates an example computing environment 100 in which a cloud data platform 102 can implement a Post-Hoc Calibration (PHC) Solution Set based on a combination of temperature scaling, softmax denominator top-k probabilities selection, and polynomial regression, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the cloud data platform 102 in communication with a cloud storage platform 104 (e.g., AWS*, Microsoft Azure Blob Storage*, or Google Cloud Storage). The cloud data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the cloud data platform 102.

The cloud data platform 102 comprises a compute service manager 108, an execution platform 110, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts, such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the cloud data platform 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, metadata database(s) 112 may include a summary of data stored in remote data storage systems as well as data available from a local cache. Additionally, metadata database(s) 112 may include information regarding how data is partitioned and organized in remote data storage systems (e.g., the cloud storage platform 104) and local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can comprise millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, avoiding those non-pertinent micro-partitions when responding to the query, and scanning only the pertinent micro-partitions to respond to the query. Metadata may be automatically gathered on all rows stored in a micro-partition, including the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata database 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

Figure 2:
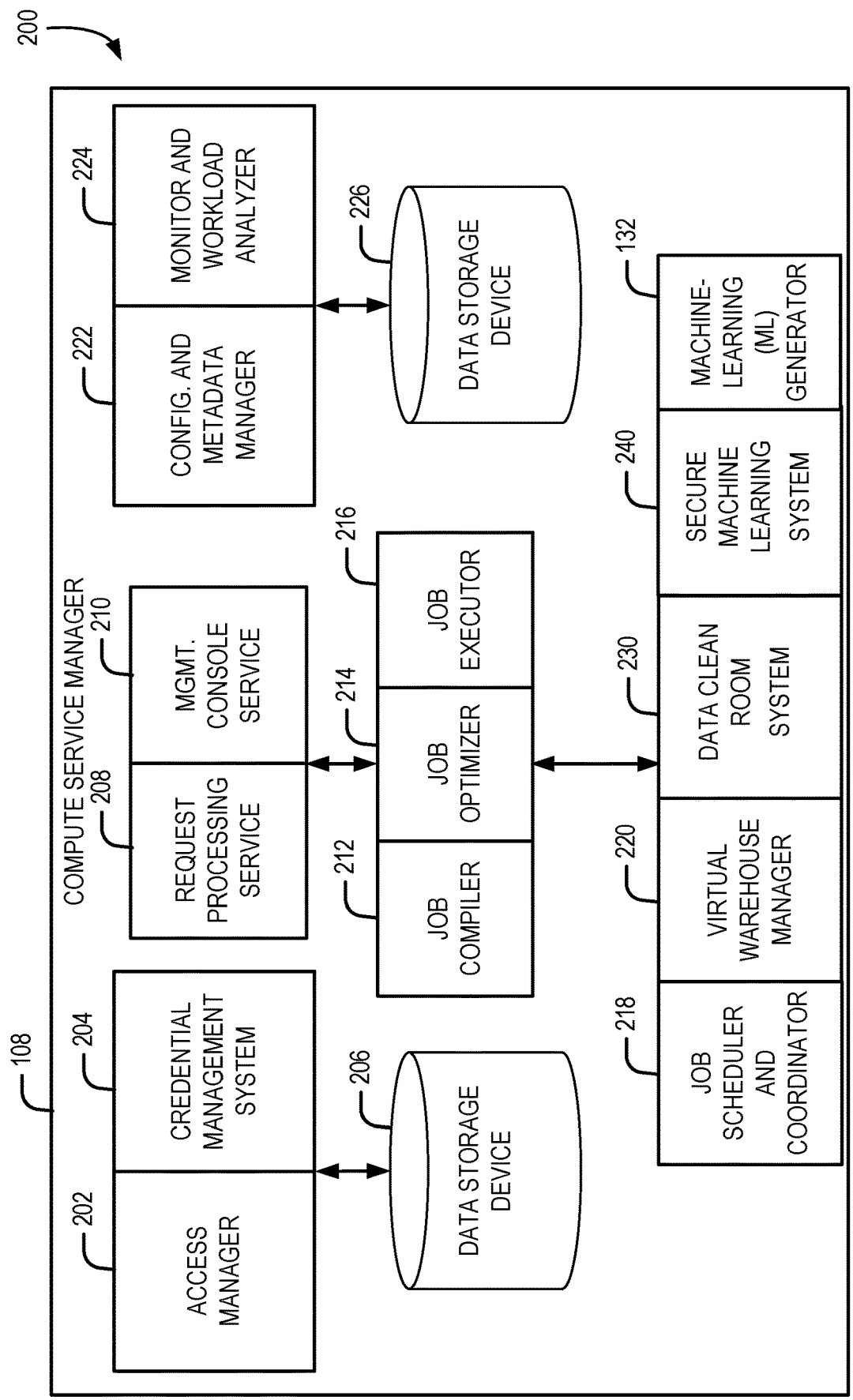
FIG. 2 is a block diagram illustrating components of a compute service manager, according to some example embodiments.

In some embodiments, the cloud data platform 102 includes a machine-learning (ML) generator 132. The ML generator 132 comprises suitable circuitry, interfaces, logic, and/or code and is configured to provide generation of ML models for extracting information from one or more documents (e.g., electronic documents) according to various embodiments. In some embodiments, the ML generator 132 can include one or more system functions that can be used to implement a method of generating an ML model as described herein. In some examples, the ML generator 132 can be operatively interconnected to the compute service manager 108, within the compute service manager 108 (as depicted in FIG. 2), connected to the execution platform 110, connected to the meta database(s) 112, or otherwise connected within or operatively to the cloud data platform 102 via additional external connections.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112, execution platforms 110, and cloud storage platforms 104 may be implemented as a distributed system (e.g., distributed across multiple systems/platforms at multiple geographic locations). Additionally, each of the compute service managers 108, metadata databases 112, execution platforms 110, and cloud storage platforms 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to data storage device 206, which is an example of the metadata databases 112. Access manager 202 handles authentication and authorization tasks for the systems described herein.

The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., access metadata database, a credential object, and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and then processed in the prioritized order. In an embodiment, the job scheduler and coordinator 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries, requests, or the like.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), but should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

The data clean room system 230 allows for dynamically restricted data access to shared datasets. Data clean room is one part of data sharing and is just one example of the marketplace.

As previously mentioned, the compute service manager 108 can include the ML generator 132 and/or be operatively interconnected to the ML generator 132 configured to generate ML model for extracting information from one or more documents according to various embodiments. As explained throughout, in some example embodiments, the ML generator 132 can be integrated into a database clean room, and/or used in conjunction with, parallel to, or in combination with a secure machine learning system 240 as depicted and described above with reference to FIG. 2. The database clean room enables two or more end-users of the cloud data platform 102 to share and collaborate on their sensitive data, without directly revealing that data to other participants. In alternative example embodiments, the ML generator 132 can be configured externally from compute service manager 108 and from cloud data platform 102, instead being operatively interconnected via one or more layers.

Figure 3:
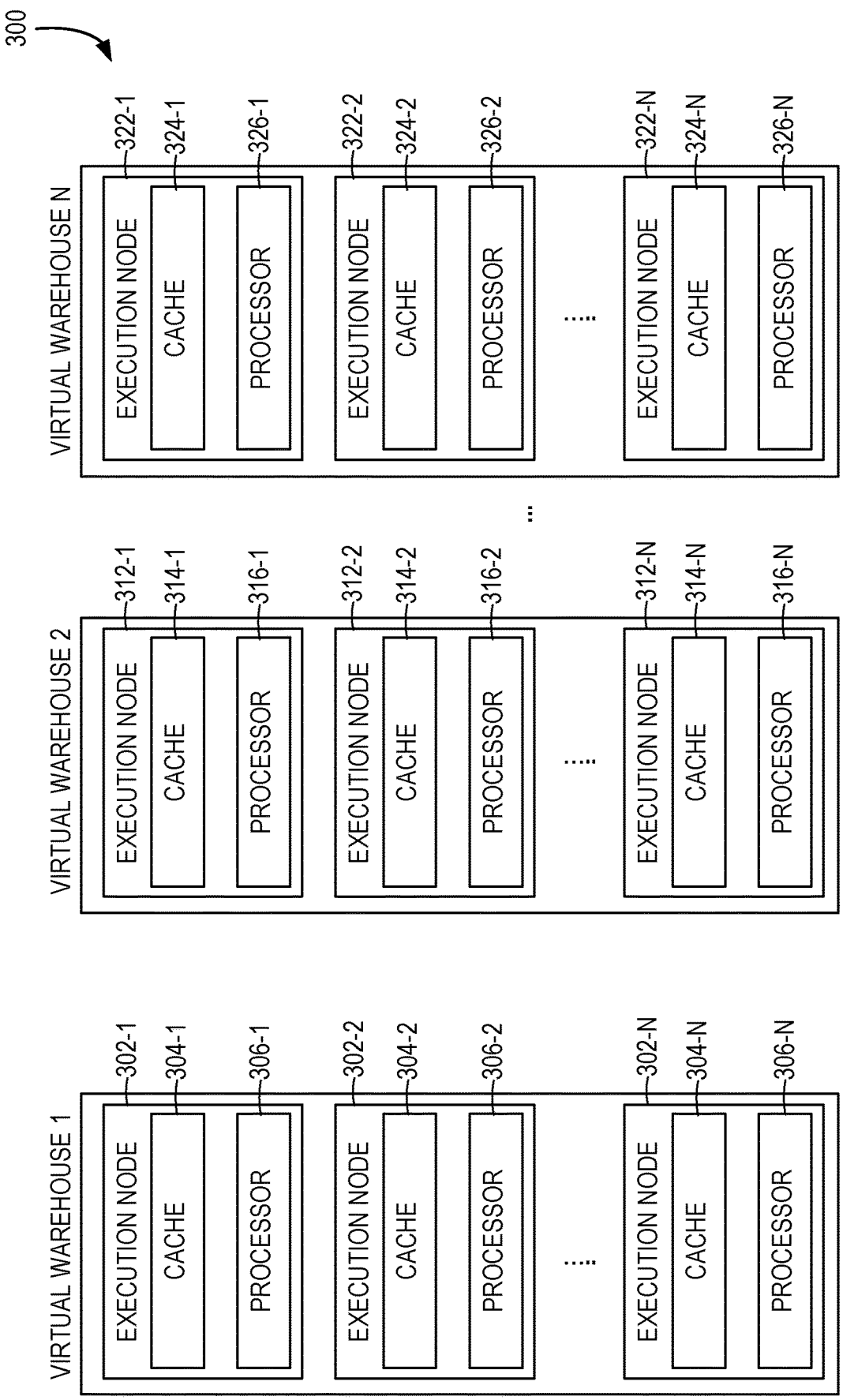
FIG. 3 is a block diagram illustrating components of an execution platform, according to some example embodiments.

FIG. 3 is a block diagram 300 illustrating components of the execution platform 110 of FIG. 1, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
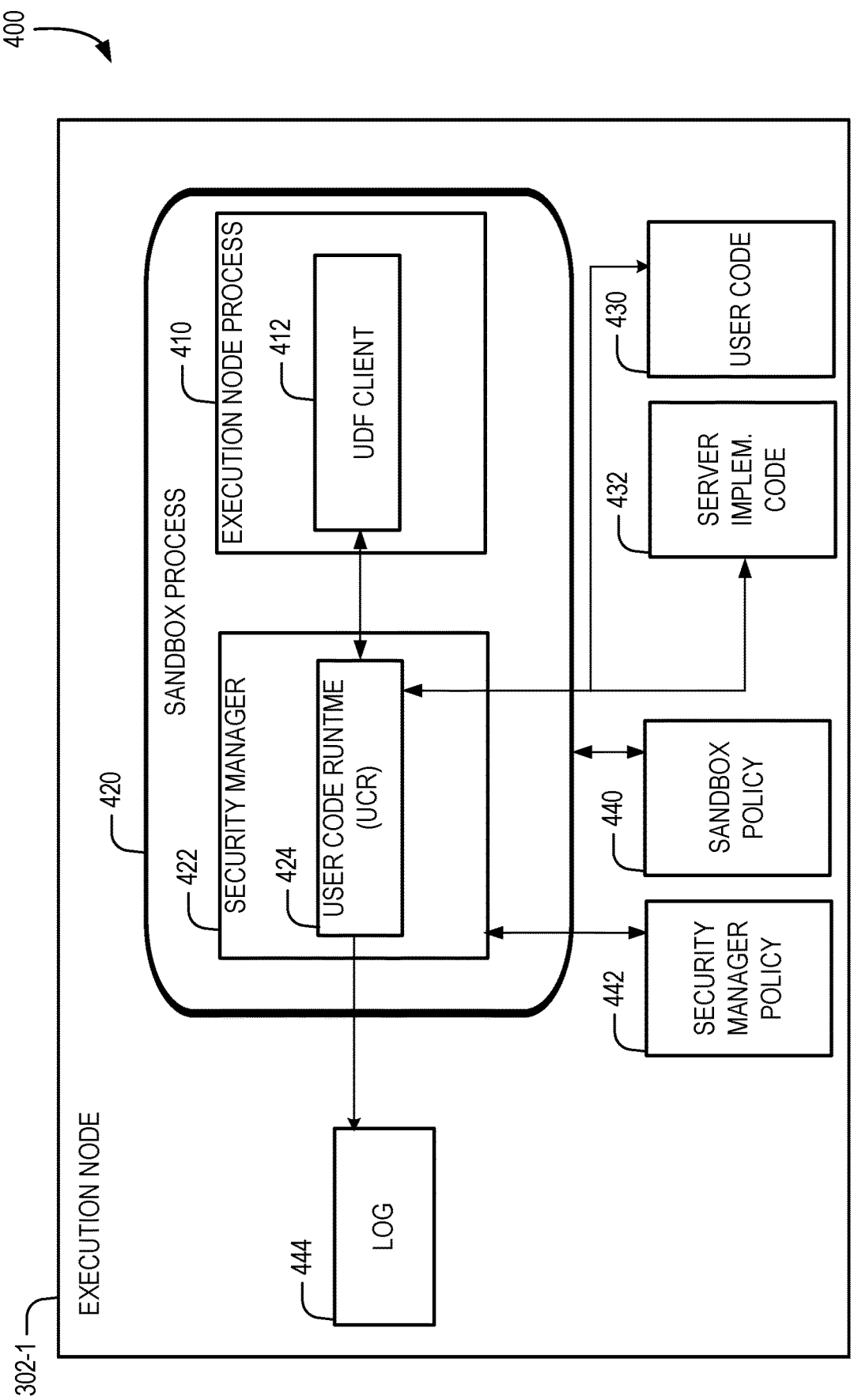
FIG. 4 is a computing environment conceptually illustrating an example software architecture executing a user defined function (UDF) by a process running on a given execution node of the execution platform, according to some example embodiments.

FIG. 4 is a computing environment 400 conceptually illustrating an example software architecture executing a user-defined function (UDx) by a process running on a given execution node of the execution platform 110 of FIG. 3, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 of FIG. 1 validates all communication from the execution platform 110 of FIG. 1 to validate that the content and context of that communication are consistent with the task(s) known to be assigned to the execution platform 110. For example, the execution platform 110 executing a query A is not allowed to request access to a particular data source (e.g., data storage device 226 of FIG. 2 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one with the same or fewer potential security exploits).

User code 430 may be provided as a package, e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA-based UDF) can be performed by a user code runtime 424 executing within a sandbox process 420. In an embodiment, the user code runtime 424 is implemented as a virtual machine, such as a JAVA virtual machine (JVM). Since the user code runtime 424 executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the cloud storage platform 104.

Examples of the log 444 can include logging for observability and debuggability. Logging can be automatically configured to observe egress traffic using a logging mechanism with runtime-configurable verbosity levels. For example, use of an event output log or event output helper can allow for passing custom structs from the eBPF program to a performance event ring buffer along with an optional packet sample. In response, the execution platform worker can pull the logs from log 444 or other logs from the buffer and write to execution platform logs, as an example. This channel can be used to log, debug, sample, and/or push notifications for network policy violations and the like. For example, the event output log or helper can be configured to pass the data through a lockless memory mapped per-CPU performance ring buffer, which is significantly faster (e.g., more efficient) than default logging support in eBPF.

Additional examples of the log 444 or other logs of the cloud data platform 102 can be used to provide clear and actionable feedback necessary for users if their UDF's packet has been blocked. With the logging mechanism, the cloud data platform 102 or component thereof can report details back to the user (e.g., which IP and port has been blocked or violated the account policy). Additionally, when an unauthorized DNS request has been blocked, the eBPF program can intercept the packet and report back which hostname it tried to access and enter such information into the log 444, which is valuable for helping customers to troubleshoot and debug their UDx.

Moreover, such results can be returned from the user code runtime 424 to the UDF client 412 utilizing a high-performance protocol (e.g., without serialization or deserialization of data, without memory copies; operates on record batches without having to access individual columns, records, or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Security manager 422, in an example, can prevent completion of an operation from a given UDF by throwing an exception (e.g., if the operation is not permitted), or returns (e.g., doing nothing) if the operation is permitted. In an implementation, the security manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

For example, the instance of a computer program can be instantiated by the execution platform 110. For example, the execution node 302-1 can be configured for instantiating a user code runtime to execute the code of the UDF and/or to create a runtime environment that allows the user's code to be executed. The user code runtime can include an access control process including an access control list, where the access control list includes authorized hosts and access usage rights or other types of allow lists and/or block lists with access control information. Instantiating a sandbox process can determine whether the UDF is permitted and instantiating the user code runtime as a child process of the sandbox process, the sandbox process configured to execute the at least one operation in a sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, inter-process communication, and the like) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., an object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
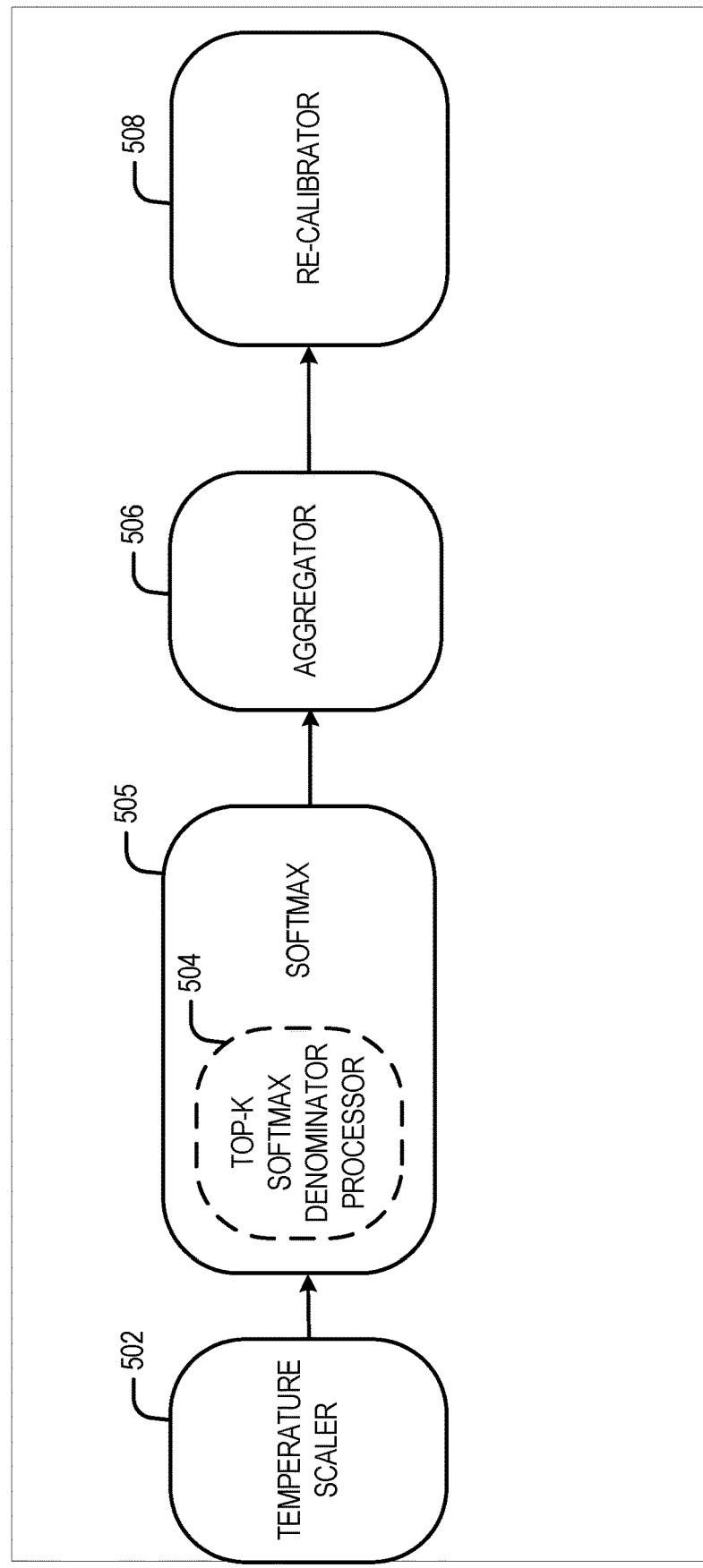
FIG. 5 illustrates components of a Post-hoc Calibration (PHC) Solution Set, according to some example embodiments.

FIG. 5 illustrates a block diagram providing components of the Post-Hoc Calibration (PHC) Solution Set 500, according to example embodiments of the present disclosure. The PHC Solution Set 500 includes a grouping solution that incorporates a combination of three basic solutions (e.g., three ML concepts) used jointly to achieve a unique capability of improving both selective prediction quality (e.g., accuracy, F1 score, etc.) and calibration quality.

The PHC Solution Set 500 includes a temperature scaler 502, a softmax function 505, an aggregator 506, and a re-calibrator 508, while it will be understood by those having skill in the art that the PHC Solution Set 500 can have one or more additional components. The temperature scaler 502 is configured to perform a temperature scaling function by processing a sequence of per-token logits vectors. Temperature scaling is the most widely described post-calibration method. It is computationally very inexpensive. In order to improve selective prediction quality and/or calibration quality, temperature scaling via the temperature scaler 502, must be applied with a softmax temperature parameter carefully optimized for the particular use case, such as zero-shot out-of-distribution prediction or fine-tuned-model in-distribution prediction (where each use case is further described and depicted in connection with FIGS. 9-11).

Top-k softmax is a variation of the softmax function used in machine learning. In a well-tuned temperature scaling example, such as the temperature scaler 502, increasing the softmax temperature can improve both selective prediction quality and calibration quality in a zero-shot use case example. However, in a fine-tuning use case, temperature scaling can improve selective prediction quality when the softmax temperature is decreased (e.g., rather than being increased, as in a zero-shot use case). In such a case (e.g., in contrast to the zero-shot use case), improvement of selective prediction quality obtained by means of temperature scaling can lead to degradation of calibration quality. To compensate for this degradation, temperature scaling can be supplemented by regression-based post-hoc calibration.

In the context of LLM-based document understanding (e.g., generative artificial intelligence, generative pre-trained transformer (GPT) language model(s), pre-trained general artificial intelligence, etc.), it is important to note that each prediction's confidence score and/or answer's confidence score is computed from a list of per-token confidence scores. Each of the prediction's confidence score and/or answer's confidence score is aggregated according to an aggregator 506, which receives input from the temperature scaler 502 transformed by the softmax function 505. The softmax function 505 can include an optional top-k softmax denominator processor.

Example embodiments further include identifying and measuring the degree to which the problem is solved. For example, in order to avoid compromising calibration by selective prediction accuracy or vice versa, quality can be measured at the same time as selective prediction accuracy. Selective prediction accuracy, which is understood as the standard, exact-match accuracy or as F-score (e.g., F1 score can be measured for some fraction of the most confident answers and/or predictions) and calibration quality is typically evaluated as Expected Calibration Error (ECE), while the lower the error is the better the calibration quality is. The F1 score is a measure used in statistics and machine learning to evaluate the accuracy of binary classification systems, which are systems that categorize elements into one of two groups. The F1 score is particularly useful in situations where the data may be imbalanced. The F1 score is the harmonic mean of precision and recall, two other measures of accuracy. Precision measures the number of true positive results divided by the sum of true positives and false positives. The F1 score identifies (e.g., determines, monitors, etc.), of all the items the system identified as positive, how many were actually positive. Recall (as opposed to precision) measures the number of true positives divided by the sum of true positives and false negatives. Recall determines (e.g., asks, identifies, etc.) of all the actual positive items, how many did the system correctly identify. The F1 score balances these two measures (e.g., precision and recall). For example, an F1 score of 1 indicates perfect precision and recall, while an F1 score of 0 indicates that either the precision or the recall is zero. The F1 score is a useful measure when both false positives and false negatives are important considerations.

Additionally, example embodiments determine the degree to which the problem is solved in different use cases. For example, it is important to distinguish between the modes of applying example embodiments of the present disclosure in different (e.g., distinct) scenarios. In a zero-shot application scenario, for example, the temperature scaling component of the proposed solution generally improves both calibration and selective prediction quality (e.g., enabling even further improvement is provided when used in combination with post-hoc calibration based on polynomial regression. For example, in a fine-tuning based prediction scenario the very same temperature scaling component of the examples proposed herein, when used alone, may improve selective prediction quality while compromising calibration quality. Therefore, in a fine-tuning based prediction scenario example, an application of the proposed combination of temperature scaling and post-hoc calibration based on polynomial regression can provide improvement of both selective prediction quality and calibration quality, at the same time.

Additionally, an important unique property of one-dimensional, low-degree polynomial regression used for regression-based post-hoc calibration is that it has an inference computational cost that is significantly lower than the analogical cost of multi-dimensional regression-based post-hoc calibration method, and the analogical, orders of magnitude higher cost of an additional LLM training, fine-tuning, and/or inference that could also be used as alternative means for re-calibration according to a re-calibrator 508. The re-calibrator 508 can improve both the calibration and selective prediction accuracy of TILT using the softmax temperature scaling solution (e.g., as a re-calibration solution), including an optional top-k softmax denomination based on the optional denominator from the top-k softmax denominator processor 504. For example, the re-calibrator 508 can include a regression-based post-hoc calibration function that processes a single number, which is the result of an aggregation of per-token probabilities (e.g., such as aggregation based on geometric mean) into a preliminary, non-re-calibrated (e.g., not recalibrated) confidence score, into a single number being a final, recalibrated confidence score.

Apart from the post-hoc calibration based on polynomial regression, no regression-based post-hoc calibration exists that has the capability of ensuring that there is no risk of selective prediction quality degradation (e.g., introduced as a side-effect of regression-based post-hoc calibration) in a way that has low computational cost. There is not such a risk until the regression-based post-hoc calibration is monotonic.

This unique feature is a result of the unique property of polynomial regression, including the ability of computationally efficient automated monotonicity analysis based on the differential calculus. More precisely, based on checking the number of polynomial roots for the probabilistic domain of interest. Due to this property, monotonicity of any set of one-dimensional low-degree polynomial regression model coefficients can be efficiently and confidently tested before the deployment of the model as a means for post-hoc calibration.

In some examples, the PHC Solutions Set provides superior outcomes in document understanding use cases, such as zero-shot prediction and fine-tuning based prediction use cases, as well as additional prediction use cases. For example, zero-shot prediction includes when a customer uses a foundational LLM and the fine-tuning-based prediction use case, when a customer uses its own version of an LLM but is fine-tuned on the customer's own data (e.g., different than any other LLM, and one used by any other customer in the fine-tuning-based prediction use case).

In a zero-shot use case application of moderate temperature scaling, when used alone, can improve both selective prediction quality and calibration quality; however, when it is combined with post-hoc calibration based on polynomial regression it can provide a hybrid PHC solution that is superior to the temperature scaling in terms of both selective prediction quality and calibration quality. Moreover, when top-k softmax denomination is applied in combination with temperature scaling and post-calibration based on polynomial regression, in some example embodiments it can improve the selective prediction quality even more.

Figure 6:
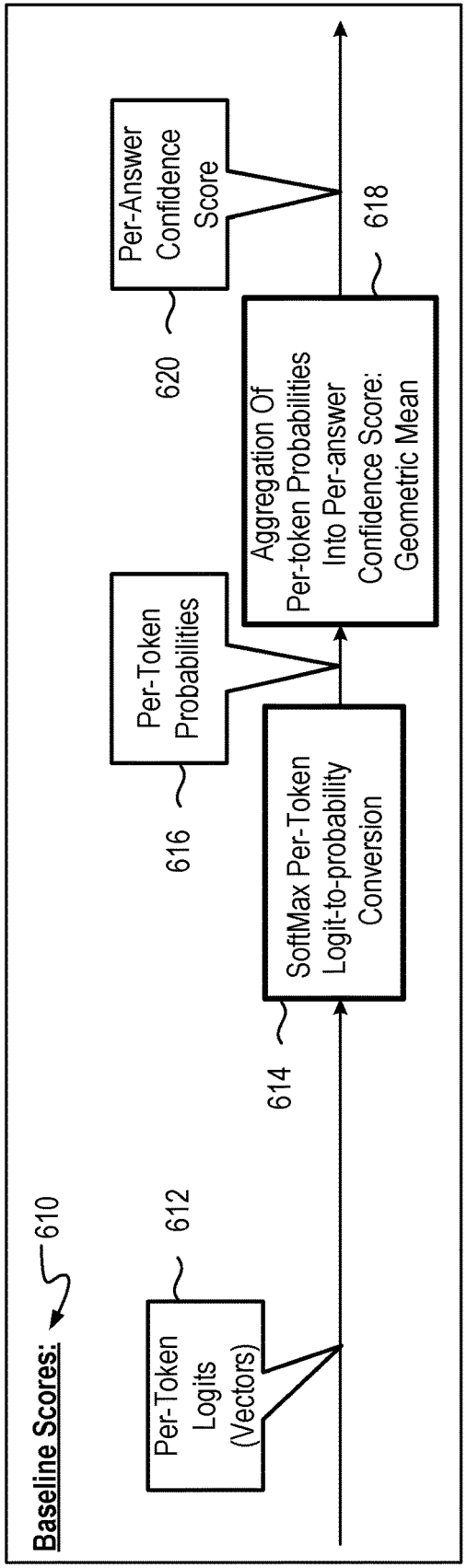
FIG. 6 illustrates baseline solutions, according to some example embodiments.

FIG. 6 illustrates a block diagram 600 of a baseline scoring solution, in accordance with some example embodiments. The block diagram 600 includes baseline scores 610, such as a baseline confidence score, as opposed to confidence scoring according to the PHC Solution Set as illustrated in FIG. 7, in accordance with some example embodiments.

According to the baseline scores 610, per-token logits (vectors) 612 are converted to probabilities at step 614 using softmax. The per-token probabilities 616 are aggregated at step 618 into per-answer confidence scores 620 according to a geometric mean. In additional example embodiments, in another assumption in which the baseline is the most widely used way of generating confidence scores (e.g., with geometric mean of per-token probabilities used as the confidence score and without any temperature scaling nor any other post hoc confidence scoring improvement solutions applied). In additional example embodiments, Bayesianisation combined with Gaussian process regression (GPR)-based post-hoc calibration does not compromise the selective prediction performance of T5 Large Language Model (LLM) with Bayesian Language Modeling Head (LMH).

Figure 7:
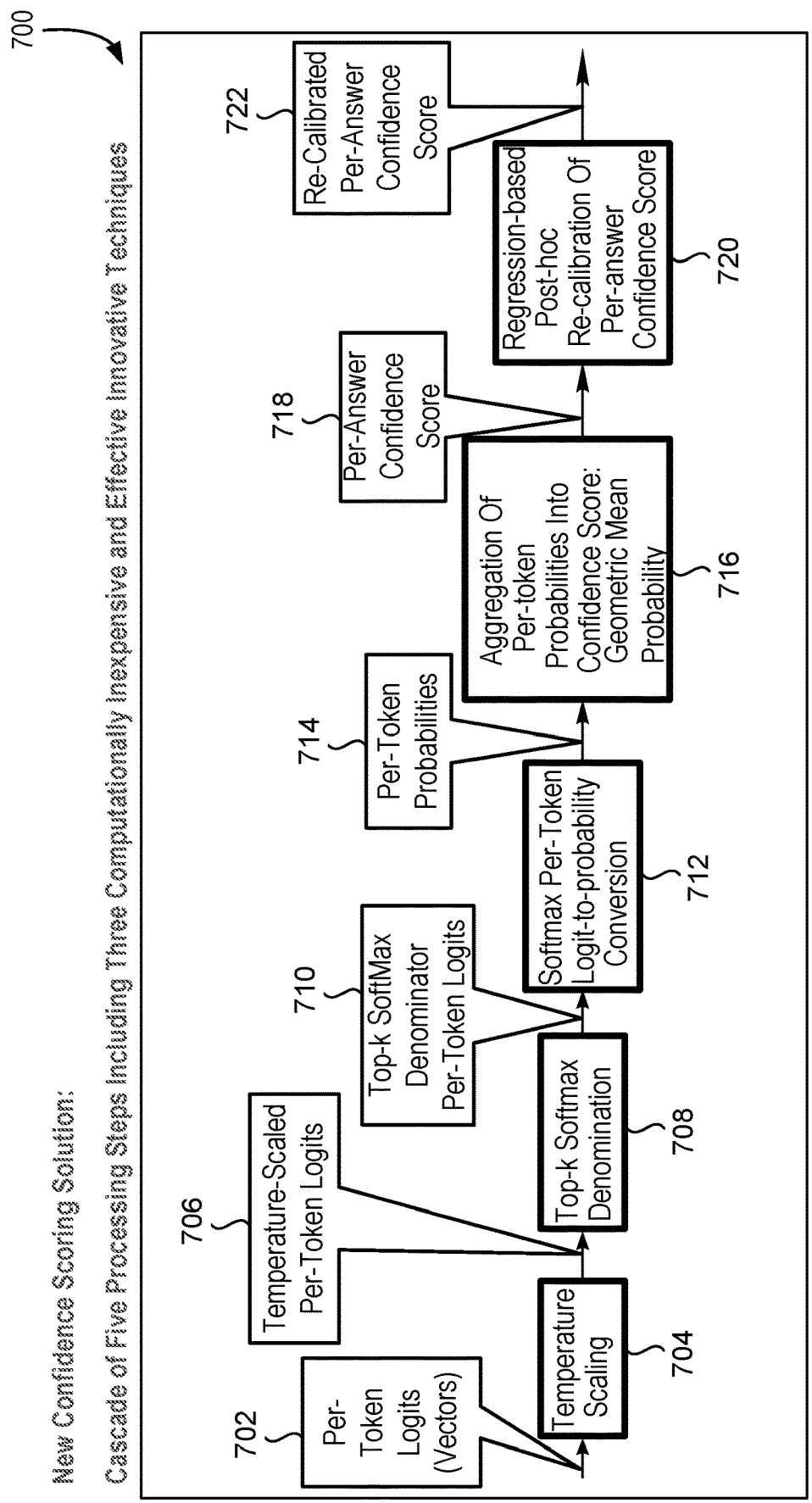
FIG. 7 illustrates an example of a confidence scoring solution as a cascade of five processing steps including the three computationally inexpensive, but effective, techniques constituting PHC Solution Set (with top-k truncated softmax denomination turned on), according to some example embodiments.

FIG. 7 illustrates a block diagram 700 depicting an example of a confidence scoring solution including a cascade of five processing steps including three computationally inexpensive, but effective innovative techniques, according to some example embodiments.

When properly configured (e.g., in terms of setting the softmax temperature, k of top-k softmax denomination, and values of polynomial regression coefficients), application of the examples of the PHC Solution Set described herein in a zero-shot prediction scenario example can lead to two additional improvements over existing art. Such improvements are illustrated in the charts depicted in FIG. 8 and FIG. 9 corresponding to an example use case application to a document understanding system for example purposes, additional use cases and/or applications of examples provided herein can similarly be applied. The application of the PHC Solution Set as described herein, in at least some of fine-tuning based prediction scenarios in which the customer uses its own version of the zero-shot model fine-tuned on the customer's data can lead to two analogical improvements.

The PHC Solution Set illustrates a new configuration of TILT confidence scoring including (optional) top-k truncated softmax denomination. The per-token logits 702 are received at step 704 to be processed according to a temperature scaling process. The temperature-scaled per-token logits 706 are received at step 708, where a top-k softmax denomination is applied.

At step 712, the softmax per-token logit-to-probability conversion is performed on the top-k softmax denominator per-token logits 710 (or on the original temperature-scaled per-token logits 706, if Top-k Softmax Denomination 708 is not applied), which produces the per-token probabilities 714. The Top-k Softmax Denominator computing function is designed to accept a vector z composed of K real numbers being the top k logits. It then normalizes this vector into a probability distribution that consists of K probabilities. These probabilities are proportional to the exponentials of the input logits. Notably, before the application of the softmax function, some components of the vector could either be negative or exceed one, and they may not necessarily sum to 1. However, following the application of the softmax function, each component will fall within the interval (0,1), and the sum of the components will equal 1. This allows the components to be interpreted as probabilities, so input components of larger magnitude will correspond to larger probabilities.

At step 716, an aggregator receives the per-token probabilities 714 and aggregates the per-token probabilities into confidence scores (e.g., mean probability), and produces per-answer confidence scores 718. At step 720, a regression-based post-hoc recalibration of per-answer confidence scores is performed that creates recalibrated per-answer confidence scores 722 according to example embodiments of the present disclosure.

Figure 8:
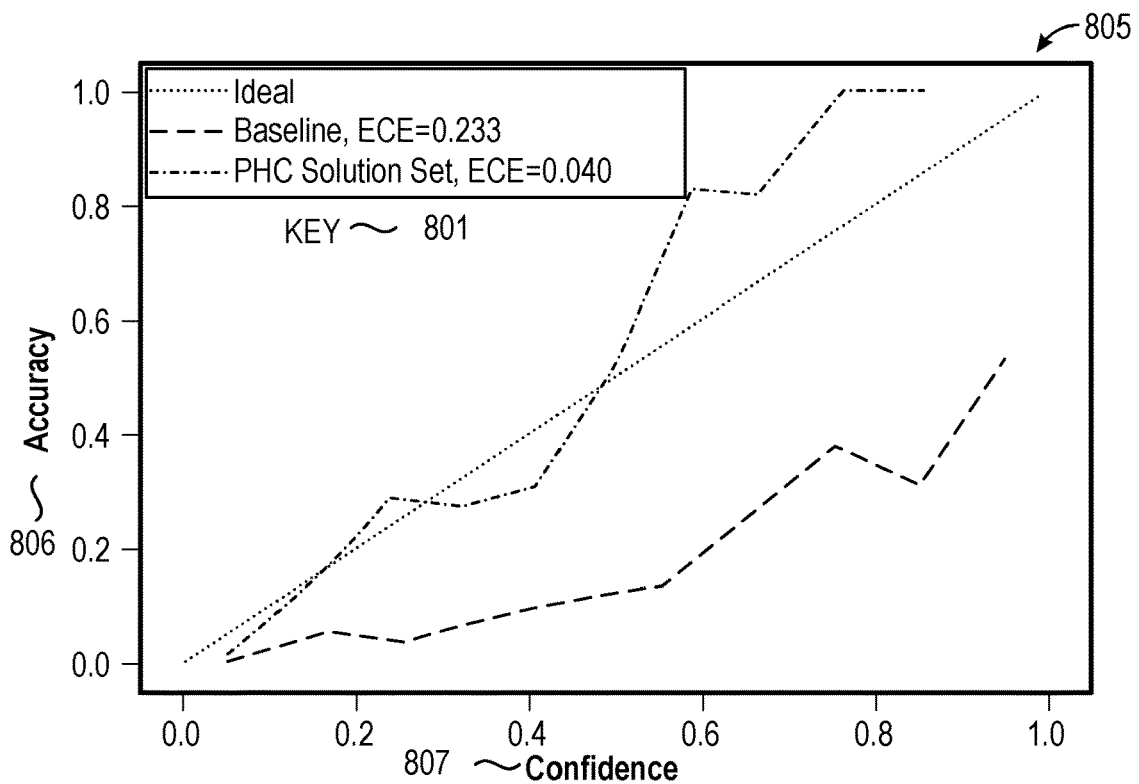
FIG. 8 illustrates charts providing accuracy as a function of confidence showing a degree to which an LLM confidence scoring post-calibration problem is solved in a zero-shot prediction and a fine-tuned-model prediction use case examples, according to some example embodiments.
Figure 8:
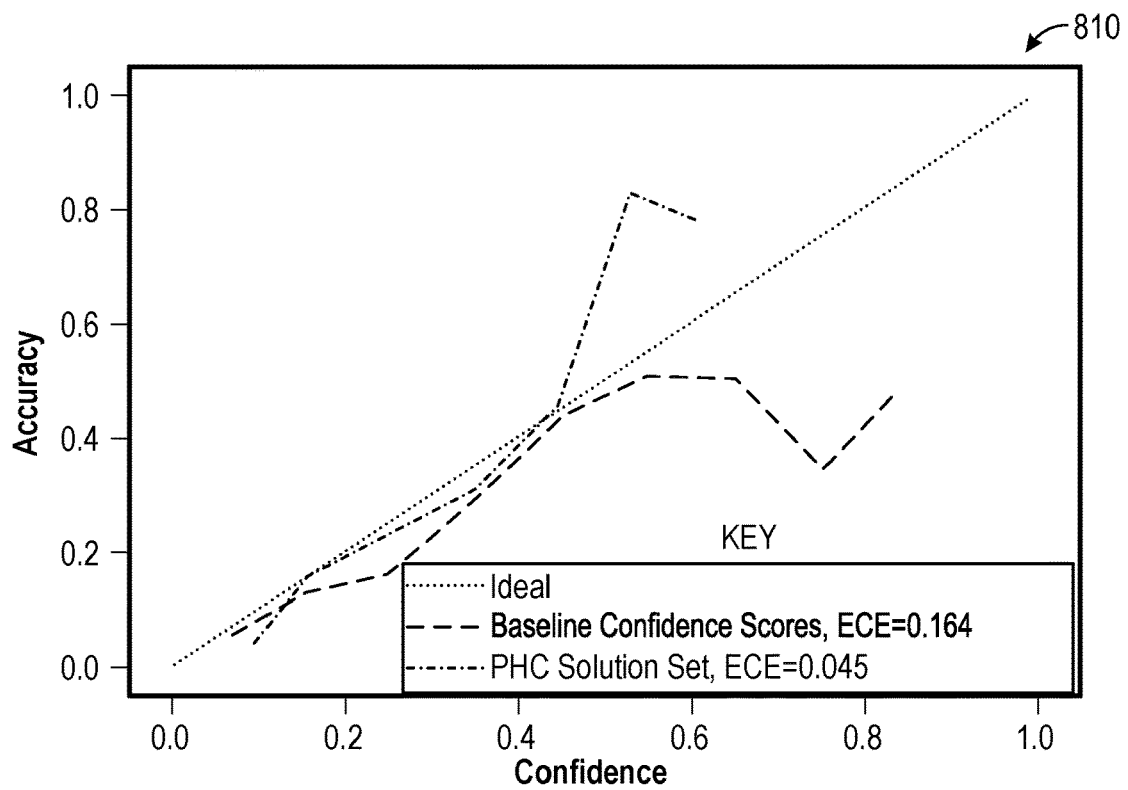

FIG. 8 illustrates charts 805/810 providing plots of accuracy 806 as a function of confidence 807 showing a degree to which the problem is solved in a zero-shot prediction use case example versus a fine-tuned use case example, according to some example embodiments.

The chart 805 provides an example of significant Expected Calibration Error (ECE) reduction in an example of a zero-shot use case, according to example embodiments of the present disclosure. The chart 805 illustrates a zero-shot prediction use case based on an exemplary simplistic dataset (e.g., an "easy" dataset). The chart 805 includes a key 801 depicting an ideal calibration, a baseline calibration, and a PHC Solution Set calibration, according to example embodiments. The type of the chart 805 is often referred to as a "calibration plot" or "reliability diagram," where the y-axis represents accuracy (or, more traditionally, fraction of positives), and the x-axis represents confidence. This type of chart is often used in machine learning to visualize the performance of a classification model. It helps to show whether the predicted probabilities of the model match the actual outcomes (e.g., how well the model is calibrated).

The present invention pertains to a method for enabling a machine learning model to make predictions on data categories it has not been explicitly trained on, herein referred to as the "zero-shot prediction use case." In conventional machine learning, a model is trained on a specific dataset and subsequently used to make predictions on similar data.

However, the present invention allows the model to generalize its learning to make predictions on new, unseen categories. For instance, if a model is trained to recognize images of cats and dogs, in a conventional setting, it would only be capable of classifying new images as either a cat or a dog. However, in a zero-shot learning scenario facilitated by the present invention, the model could potentially recognize an image of a horse, despite not having been trained on images of horses. This example embodiment proves particularly beneficial in situations where it is impractical or impossible to gather training data for every possible category the model might encounter, thereby enhancing the model's versatility and applicability across diverse data categories.

The first improvement in the zero-shot prediction scenario example can be seen related to the calibration error being significantly reduced (e.g., by a factor of approximately 5 when measured using 10-bucket ECE, the most widely used confidence scores calibration measure). In other words, example embodiments significantly reduce the mismatch between the actual model accuracy and the confidence scores.

The chart 810 provides an example illustrating improved ECE in a fine-tuned use case, according to example embodiments of the present disclosure. A customer's fine-tuned model prediction use case refers to a scenario where a customer has adjusted or "fine-tuned" a pre-existing machine learning model to better suit their specific needs or objectives. For example, a consumer might have a general machine learning model for predicting customer behavior or be provided with a general ML model from a provider based on the provider's customer behavior. However, this model might not be perfectly suited to the consumer's specific customer base or industry. Therefore, the consumer might fine-tune the provider's model by training it on the consumer's own customer data, thereby making the predictions more accurate and relevant to their specific use case of the consumer. This fine-tuning process can involve adjusting the parameters of the model, selecting different features to include in the model, or using a different algorithm to train the model. The goal is to improve the model's performance on the specific task that the customer is interested in, such as extraction of certain data points from a certain type of documents (e.g., products prices from invoices).

Returning to the chart 810, the first improvement includes a calibration error being significantly reduced (e.g., by a factor of approximately 3-4 when measured using standard 10-bucket ECE). It is an example of significant reduction (e.g., from ~0.16 to ~0.04) of ECE in a consumer's fine-tuned model prediction use case example. In other words, example embodiments significantly reduce the mismatch between the actual model accuracy and the confidence scores. Some examples can have a minor increase of selective prediction accuracy for approximately top 10% of the most confident answers (e.g., in a zero-shot prediction use case based on an exemplary simplistic dataset).

The second improvement in the zero-shot prediction scenario example can be seen related to the selective prediction accuracy being improved for low values of automation level (e.g., more precisely, for approximately a top 10% of the most confident answers), while being insignificantly reduced for medium values of automation level (e.g., more precisely, for approximately a top 20% of the most confident answers). The second analogical improvement includes selective prediction accuracy being significantly improved for low values of automation level (e.g., more precisely, for approximately a top 20% of the most confident answers).

For example, significant (e.g., from ~0.4 to ~0.7) increase of selective prediction accuracy for approximately top 20% of the most confident answers (e.g., customer's fine-tuned model prediction use case) can be identified according to examples of the present disclosure. Additional example embodiments of the PHC Solution Set can be implemented in various other use cases.

Figure 9:
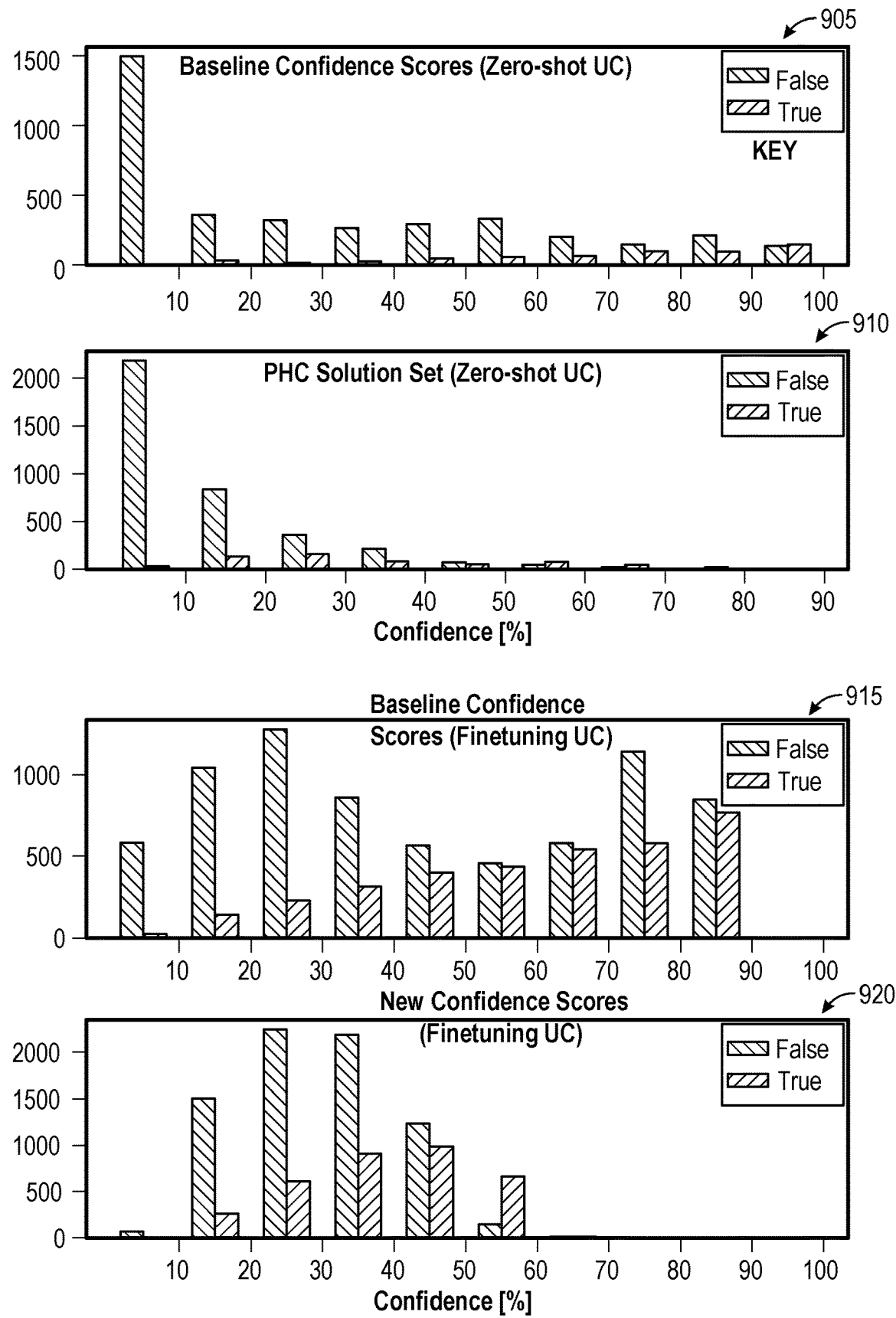
FIG. 9 is a set of charts illustrating bucketized distributions of true and false predictions for various examples of confidence scores, according to some example embodiments.

FIG. 9 illustrates charts 905/910/915/920 depicting various examples of confidence scores, according to some example embodiments.

The example charts 905 and 915 illustrate the impact of a minor increase of selective prediction accuracy coupled by a significant increase of selective prediction accuracy on a bucketed number of false predictions and true predictions. The charts 910/920 includes an example of the impact of a significant increase of selective prediction accuracy coupled by a significant increase of selective prediction accuracy on a bucketed number of false predictions and true predictions in a fine-tuning UC. An improved separation of true and false predictions shows a much lower number of overconfident false predictions and improved "true-to-false" ratios for the most confident predictions (e.g., >50%). Such fine-tuning enables users to trust the large language models more by providing better true-false separation and confidence scores closer to actual accuracy.

Figure 10:
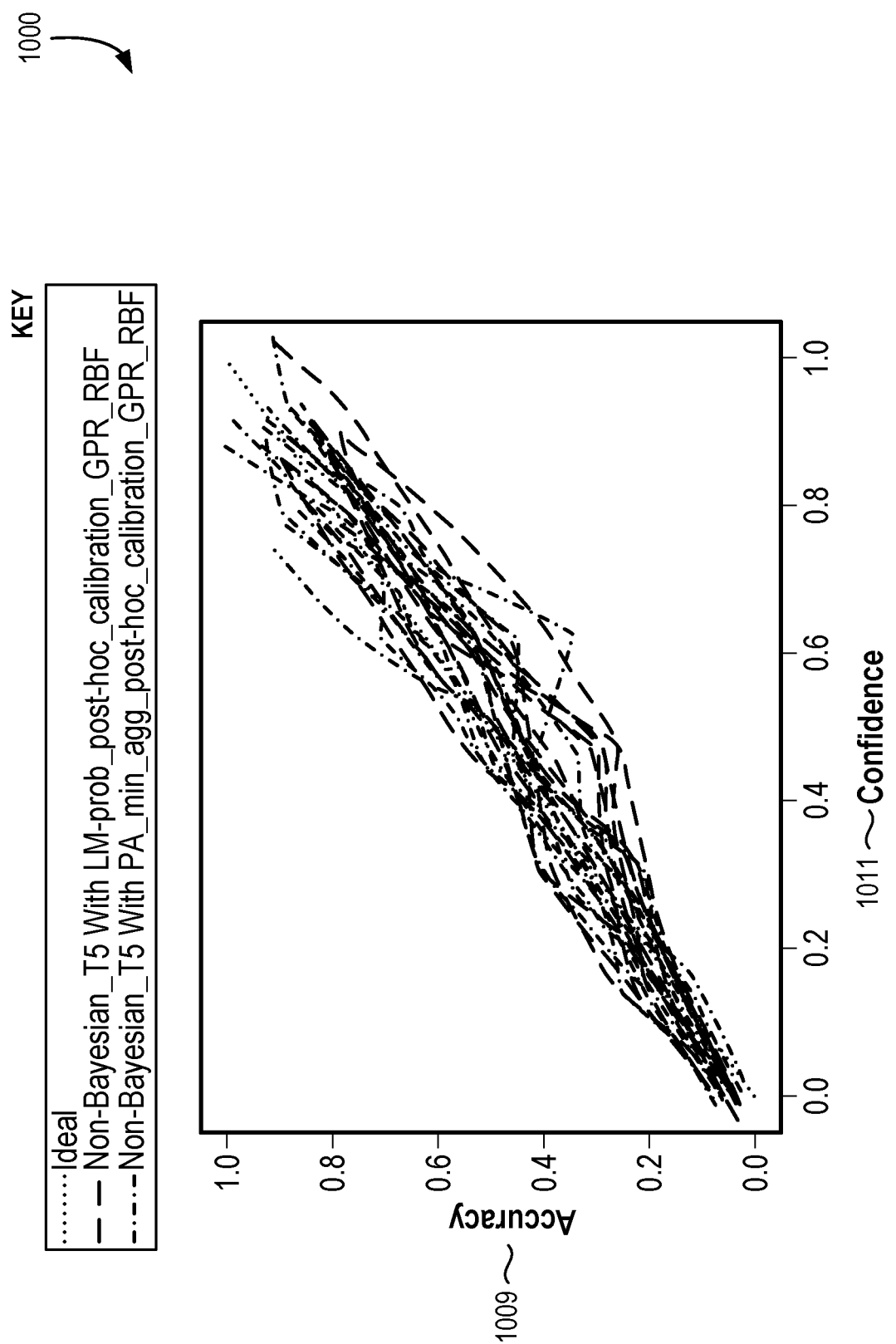
FIG. 10 illustrates a chart displaying accuracy as a function of confidence using conventional T5 large language models with post-hoc calibration for two different per-token probabilities aggregation functions, according to some example embodiments.

FIG. 10 illustrates example chart 1000 showing accuracy 1009 (y-axis) over confidence 1011 (x-axis); the chart 1000 illustrates various examples of confidence scores based on datasets showing accuracy as a function of confidence percentage, according to some example embodiments. The example chart 1000 shows an example of the impact of a nearly perfect confidence scores calibration for fine-tuning UC.

Figure 11:
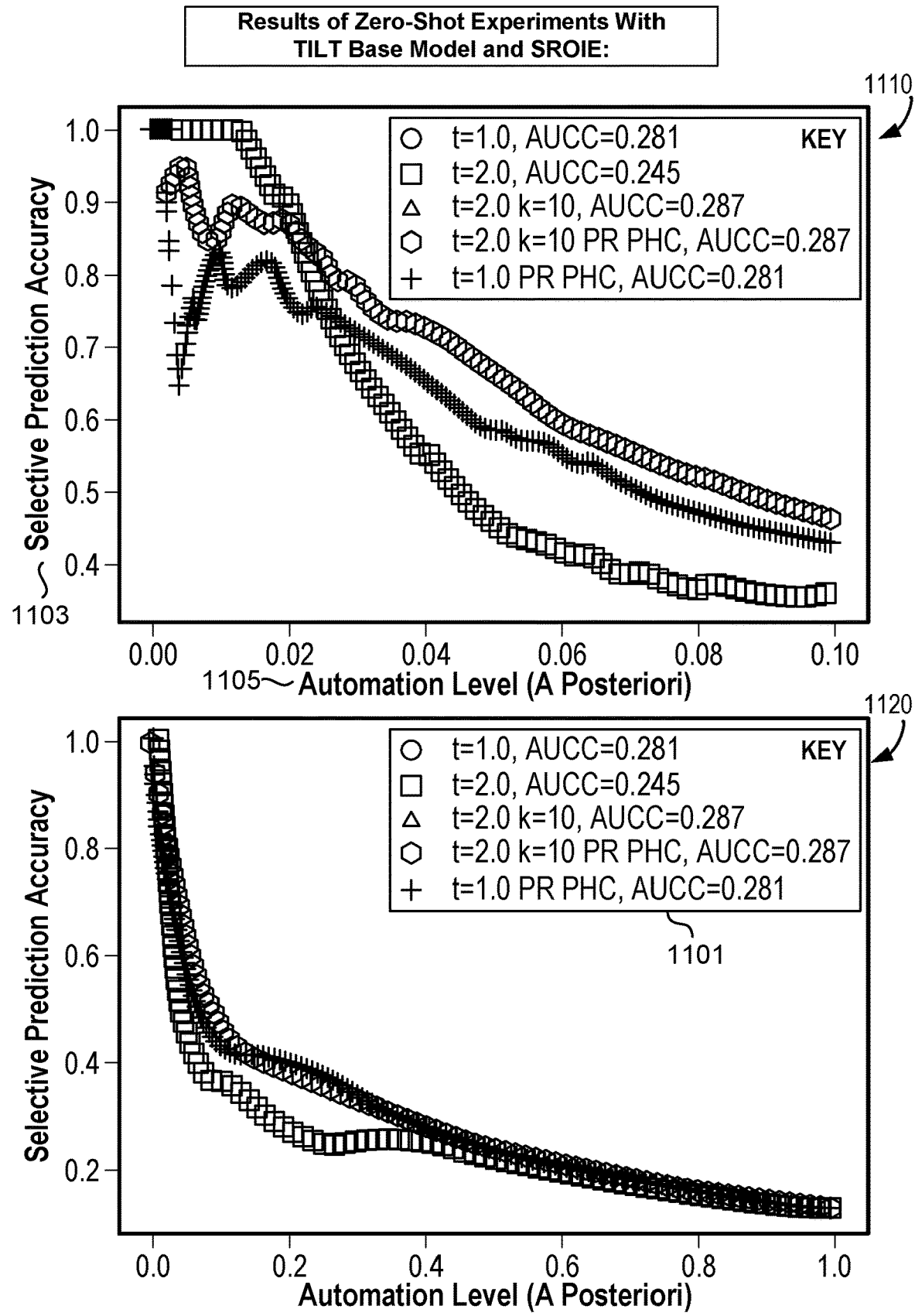
FIG. 11 is an illustration of a series of charts displaying results of zero-shot experiments with text-image-layout transformers (TILT), according to some example embodiments.

FIG. 11 illustrates an example of charts 1110/1120 depicting confidence scoring, in accordance with some example embodiments.

Key Performance Indicator (KPI)-maximizing hyperparameter optimization (HPO) refers to the practice of optimizing a machine learning model's hyperparameters to maximize a specific KPI. Hyperparameters are adjustable settings or configuration choices that are not learned directly from data, but rather set by the user or determined through HPO techniques. Where golden data is a cleansed, de-duplicated, consolidated, validated version of the original master data (sometimes referred to as "Single Version of The Truth" data).

In some examples, the confidence scoring with automated research can include a pipeline as the KPI-like epistemically noisy objective function. Some examples optionally include multiple, but not necessarily equal, predictions from any of Bayesianism model inference, and/or self-consistency sampling. In additional examples, a predictive confidence scoring model is used not just for confidence scoring, but also for sampling based LLM's best answer selection.

In accordance with the examples provided by FIG. 11, charts provide information of what customers of the cloud data platform need and/or expect from the scores in terms of their accuracy-centric interpretability. For example, a reliability curve and Expected Calibration Error (ECE) are key tools for calibration performance evaluation. According to some example embodiments, three facets of performance include median performance, guaranteed performance, and calibration. Median performance can include high median selective prediction (SP) 1103 performance for configurable (a posteriori observable/measurable) Automation Level 1105 versus performance trade-off. Guaranteed performance includes predictable "quantile-guaranteed" level of selective prediction performance, and good calibration facilitates human-interpretable reliability. FIG. 11 illustrates two charts 1110/1120 displaying results of multiple zero-shot experiments with text-image-layout transformer (TILT) base model and scanned receipts optical character recognition (OCR) and key information extraction (SROIE) dataset, according to some example embodiments.

According to some examples, based on the confidence scores solution provided by example embodiments of the PHC Solution Set disclosed throughout, both calibration quality and selective prediction accuracy of text-image-layout transformer (TILT) are improved. For example, especially when used together with the Post-Hoc Calibrator based on polynomial regression described throughout, two new techniques make it possible to improve both calibration quality and selective prediction accuracy of TILT by incorporating softmax temperature scaling and top-k softmax denomination. In some example embodiments, Expected Calibration Error (ECE) can be reduced from 0.23 to 0.04, and selective prediction accuracy increased from 0.28 to 0.29. In other examples, accuracy for the 2% most confident answers increased by approximately 20% to almost 1.00 (from less than 0.2 for 100% automation level).

In additional examples, using the new confidence scores, calibration solutions presented herein towards improving both calibration quality and selective prediction accuracy of TILT reduced the ECE from 0.233 (in the case corresponding to the best existing confidence scores modes with a standard softmax temperature equal to 1.0 and without and re-calibration) to 0.040 in the case of all three techniques (e.g., post-hoc calibrator based on polynomial regression, softmax temperature scaling, and Top-k softmax denomination) used in combination according to the PHC Solution Set. In one example, when used alone, both the temperature scaling and polynomial regression PHC reduce ECE to 0.072 and 0.065, respectively, and the Top-k softmax denomination increases accuracy for automation levels to approximately 0.2.

As described above, calibration evaluation is not easy for even the most experienced scientists, and while ECE is by far the most widely used calibration error measure, it is known to those skilled in the art to fail to ensure fully reliable assessment of recalibration solutions, so reliability curve inspection remains necessary. In particular, ECE is known to be dependent on accuracy and focusing on the lowest confidence scores values, which are both most frequent and least useful in the context of the PHC Solution Set as described in the current disclosure. In alternative examples, instance-based calibration error (ICE) is sometimes used instead or in addition to ECE; however, it is also accuracy-dependent.

In additional example embodiments, the key 1101 illustrates an Area Under the Coverage Curve (AUCC)-measured selective prediction accuracy slightly increased, such that accuracy for the most confident answers (e.g., high confidence scores) increased by approximately 10% in special use cases of extremely low automation level. Such special use cases can, for example, be used to decide when to show recommended queries proactively in AutoSQL use cases. For example, for AutoSQL users, high accuracy of high-confidence SQL query recommendations means that the model knows when it actually has a "good" query recommendation to show.

By applying the PHC Solution Set of the present disclosure, not only can any selective prediction performance degradation be avoided, but the accuracy for the lowest automation level values can be increased while not being decreased for other automation level values.

In additional example embodiments employing the confidence scores for fine-tuned TILT using prediction temperature (e.g., scaling) for selective prediction accuracy, regression-based re-calibration compensates for miscalibration. For example, for miscalibration, when introduced or not mitigated at the initial, temperature scaling step, which may be used to improve selective prediction accuracy and not calibration, fine-tuned model predictions can be tested using the impact of temperature scaling from the perspective of selective prediction accuracy. Examples find that tuning a number of epochs is more important than tuning the temperature.

In some examples, when tuned in a specific manner, temperature scaling can significantly (e.g., sometimes by tens of percentage points) improve accuracy for lower-medium automation levels. Ensuring high accuracy for the most confident answers is important for many customers. In such scenarios, temperature should be tuned for a particular combination of model and client data, so it should be a part of hyperparameter optimization coupled with TILT or other LLM model fine-tuning on client's data and the corresponding PHC regressor training.

In additional example embodiments, according to an example of the "classical" or "smooth" Gaussian process regression (GPR) kernel functions, the regression model needed is smooth, as is the kernel. Example kernel functions can include, for example, white, RBF, dot product, Rational Quadratic, and similar functions, as well their compositions. Gaussian process regression (GPR)-based post-hoc calibration requires careful "kernel engineering": There is a trade-off between local Expected Calibration Error reduction and the reliability curve monotonicity. Lack of reliability curve monotonicity may significantly degrade the selective prediction performance for the Automation Level range affected by the lack of monotonicity. So, one must be careful to avoid bad kernel engineering. Rather "classical" GPR kernel engineering rules may be applied, including a key "trick combo" being adding a white component to the rather smooth kernel (e.g., RBF extended by dot product kernel, or Rational Quadratic). The maximum likelihood kernel parameters auto-optimization may be applied to estimate the noise level "absorbed" by the white kernel component.

One example function is the one known as the white kernel:

$$k(x_1, x_2) = \text{noise\_level if } x_i == x_j \text{ else } 0$$

A second example function is the Radial Basis Function (RBF) kernel:

$$k(x_i, x_j) = \exp\left(-\frac{d(x_i, x_j)^2}{2l^2}\right)$$

A third example function is the one known as the dot product:

$$k(x_i, x_j) = \sigma_0^2 + x_i \cdot x_j$$

A fourth example function is the one known as the Rational Quadratic kernel:

$$k(x_i, x_j) = \left(1 + \frac{d(x_i, x_j)^2}{2\alpha l^2}\right)^{-\alpha}$$

Additional confidence scoring algorithms can be applied to example embodiments of the present disclosure, such as LM-Prob, Self-Con, and the like. For example, calibration-unaware tasks, can include Bayesian optimization inspiration including lower confidence bound (LCB) for confidence scoring, including a query (e.g., question), a prediction, and a confidence score used to generate an exemplary answer. Confidence scoring algorithms in the example embodiments of the present disclosure include, for example, selective model Bayesianization combined with LCB, three ways of soft-maxing, two ways of per-answer token aggregation (e.g., mean), and recalibration algorithms based on a traditional non-kernel isotonic regression.

In regard to calibration, a novel class of re-calibration algorithms can be applied, including traditional (e.g., non-kernel) isotonic regression, GPR with a white kernel component, kernels preconfigured for isotonic regression tasks, and the like.

Figure 12:
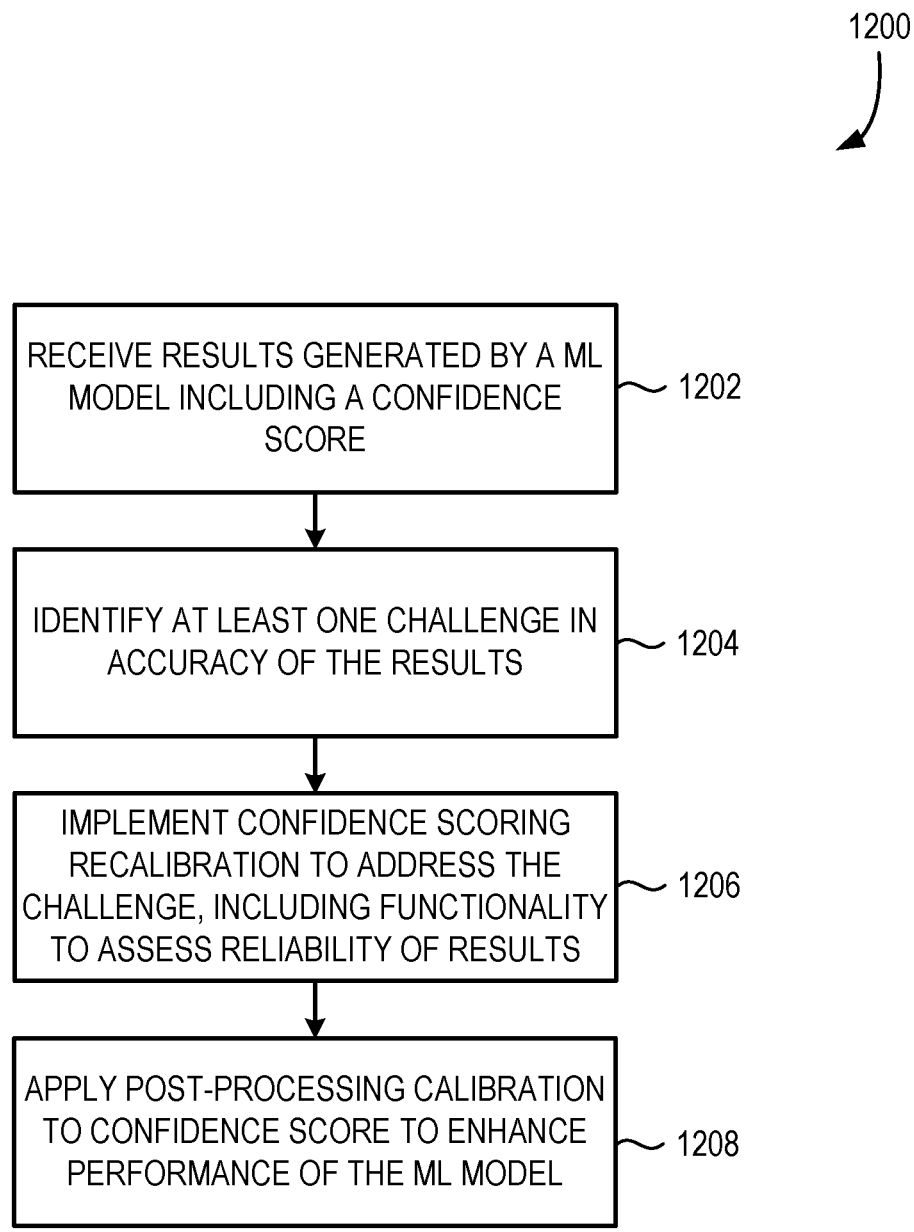
FIG. 12 shows an example flow diagram of a method for providing an LLM confidence scoring post-calibration based on a combination of temperature scaling, softmax denominator top-k probabilities selection, and polynomial regression, according to some example embodiments.

FIG. 12 illustrates a flow diagram of an example method 1200 for implementing large language model (LLM) confidence scoring post-calibration based on a combination of temperature scaling, softmax denominator top-k probabilities selection, and polynomial regression, according to some example embodiments. According to the example embodiment of FIG. 12, different example embodiments disclose methods of the secure machine learning system 240. For example, the method 1200 can be embodied in machine-readable instructions or machine storage medium for execution by one or more hardware components such that the operations of the method 1200 can be performed by components of the cloud data platform 102. Accordingly, the method 1200 is described below, by way of example with reference to components of the cloud data platform 102. However, it shall be appreciated that method 1200 can be deployed on various other hardware configurations and is not intended to be limited to deployment within the cloud data platform 102. Depending on the embodiment, an operation of the method 1200 can be repeated in different ways or involve intervening operations not shown. Though the operations of the method 1200 can be depicted and described in a certain order, the order in which the operations are performed may vary among embodiments, including performing certain operations in parallel or performing sets of operations in separate processes. While the various operations in the method 1200 are presented and described sequentially, one of ordinary skill will appreciate that some or all of the operations may be executed in a different order, be combined or omitted, or be executed in parallel.

FIG. 12 shows an example flow diagram of a method 1200 for providing an LLM confidence scoring post-calibration based on a combination of temperature scaling, softmax denominator top-k probabilities selection, and polynomial regression, according to some example embodiments. At operation 1202, the machine learning system 240 receives results generated by a machine learning (ML) model, the results including at least one confidence score. At operation 1204, the secure machine learning system 240 identifies (e.g., addresses, recognizes, etc.), by one or more hardware processors, at least one challenge in accuracy of the results generated by the ML model configured to perform document processing and understanding. At operation 1206, the secure machine learning system 240 implements confidence scoring recalibration to address the at least one challenge, the confidence scoring recalibration including functionality to assess reliability of the results generated by the ML model, and at operation 1208, the secure machine learning system 240 applies post-processing calibration to the at least one confidence score generated by the confidence scoring recalibration to enhance performance of the ML model, the post-processing calibration including adjusting the at least one confidence score generated by the confidence scoring recalibration.

In some examples, a user can provide feedback that represents annotations to the electronic document. As described herein, eventually, the user feedback can be used to adjust (e.g., train or fine-tune) the selected ML model during a training process. For various embodiments, the custom ML model is a data object, which can be used in a database statement or with a document information extraction pipeline.

Figure 13:
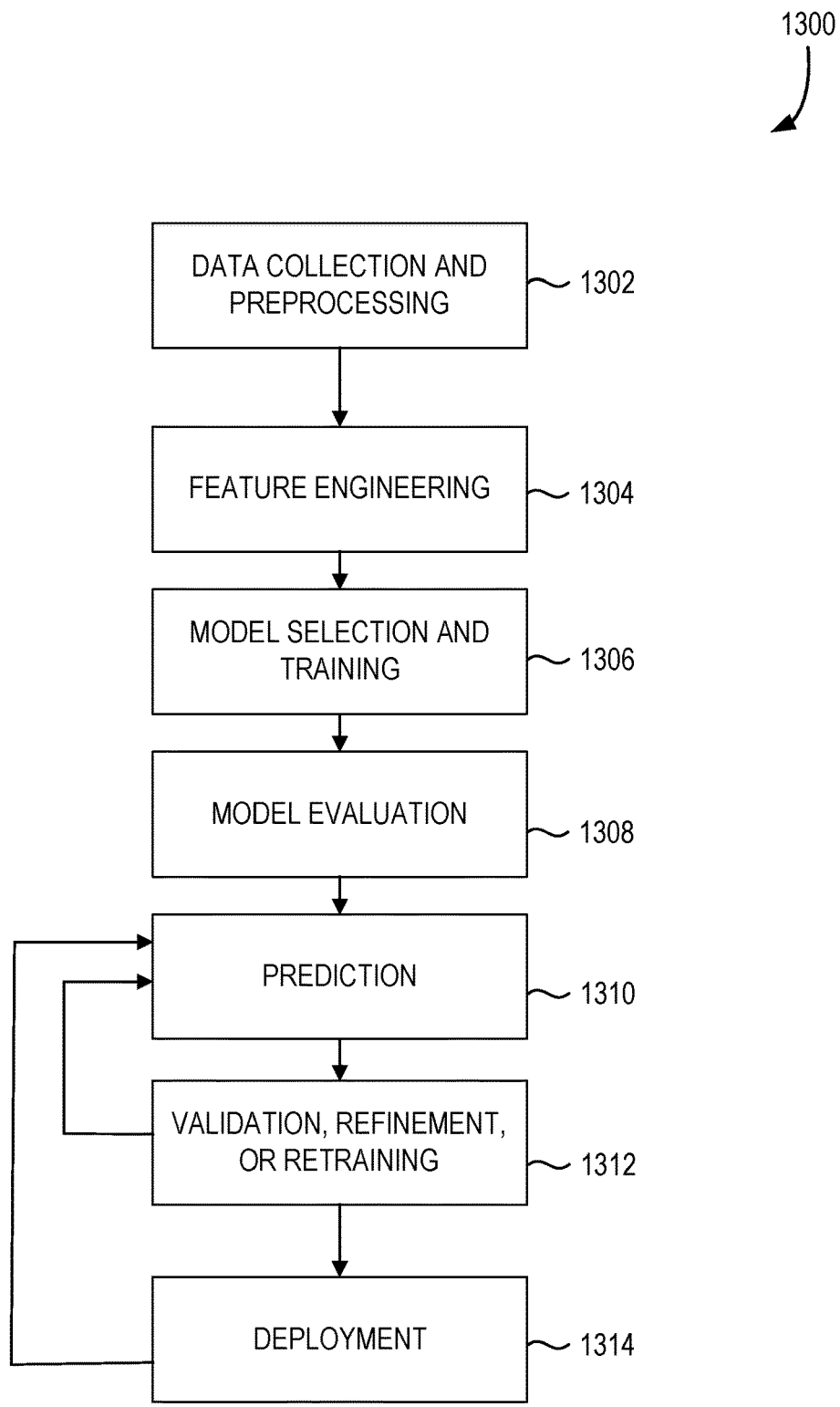
FIG. 13 illustrates a machine-learning pipeline, according to some example embodiments.
Figure 14:
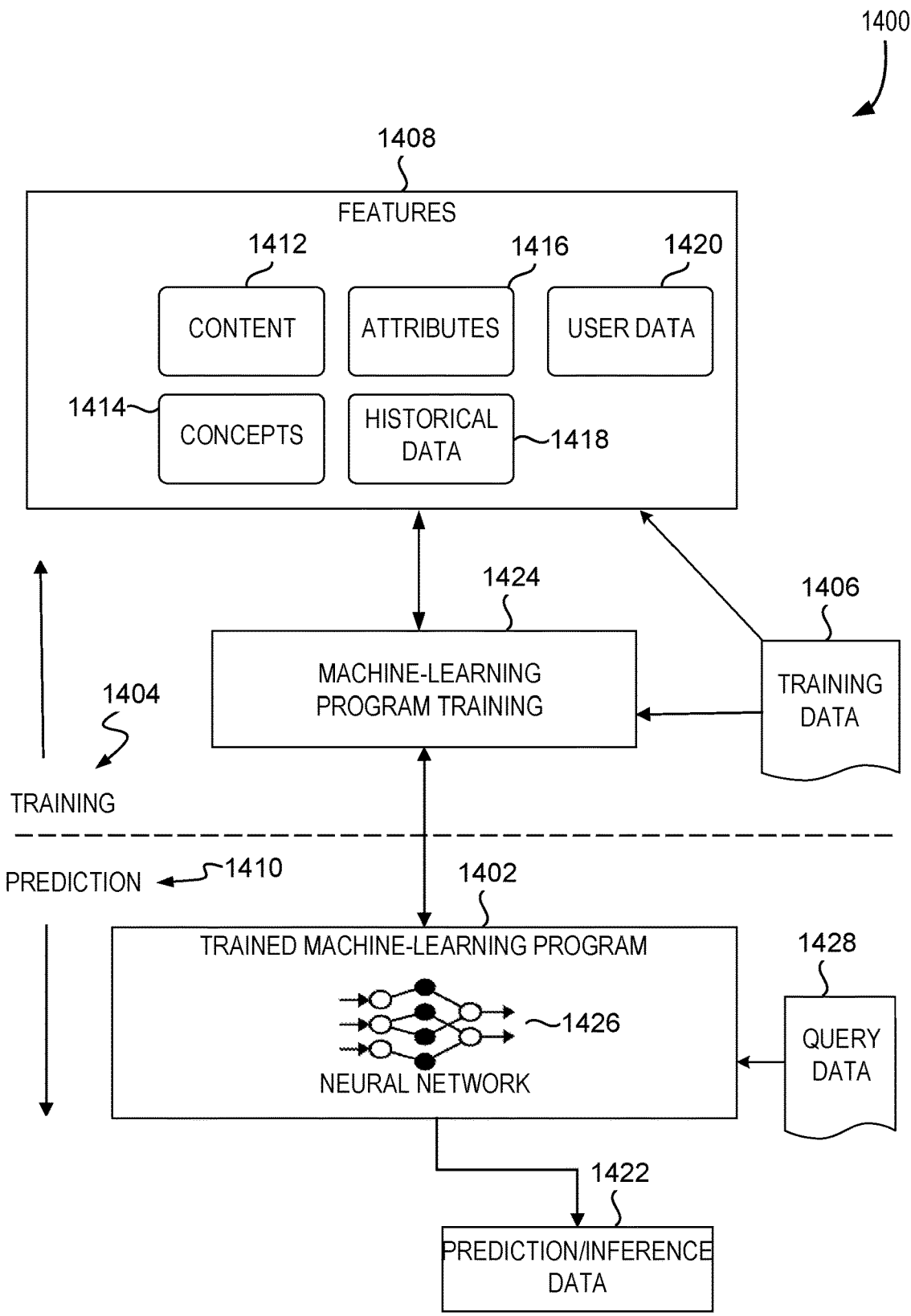
FIG. 14 illustrates training and use of a machine-learning program, according to some example embodiments.

FIG. 13 depicts a machine-learning pipeline 1300 and FIG. 14 illustrates training and use of a machine-learning program (e.g., model) 1400. Specifically, FIG. 13 is a flowchart depicting a machine-learning pipeline 1300, according to some examples. The machine-learning pipeline 1300 can be used to generate a trained model, for example the trained machine-learning program 1402 of FIG. 14, to perform operations associated with searches and query responses.

Broadly, machine learning may involve using computer algorithms to automatically learn patterns and relationships in data, potentially without the need for explicit programming. Machine learning algorithms can be divided into three main categories: supervised learning, unsupervised learning, self-supervised, and reinforcement learning.

For example, supervised learning involves training a model using labeled data to predict an output for new, unseen inputs. Examples of supervised learning algorithms include linear regression, decision trees, and neural networks. Unsupervised learning involves training a model on unlabeled data to find hidden patterns and relationships in the data. Examples of unsupervised learning algorithms include clustering, principal component analysis, and generative models like autoencoders. Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions.

Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (e.g., is this object an apple or an orange?). Regression algorithms aim at quantifying some items (for example, by providing a value that is a real number).

Turning to the training phases 1404 as described and depicted in connection with FIG. 14, generating a trained machine-learning program 1402 may include multiple phases that form part of the machine-learning pipeline 1300, including for example the following phases illustrated in FIG. 13: data collection and preprocessing 1302, feature engineering 1304, model selection and training 1306, model evaluation 1308, prediction 1310, validation, refinement, or retraining 1312, and deployment 1314, or a combination thereof.

For example, data collection and preprocessing 1302 can include a phase for acquiring and cleaning data to ensure that it is suitable for use in the machine learning model. This phase may also include removing duplicates, handling missing values, and converting data into a suitable format. Feature engineering 1304 can include a phase for selecting and transforming the training data 1406 to create features that are useful for predicting the target variable. Feature engineering may include (1) receiving features 1408 (e.g., as structured or labeled data in supervised learning) and/or (2) identifying features 1408 (e.g., unstructured, or unlabeled data for unsupervised learning) in training data 1406. Model selection and training 1306 can include a phase for selecting an appropriate machine learning algorithm and training it on the preprocessed data. This phase may further involve splitting the data into training and testing sets, using cross-validation to evaluate the model, and tuning hyperparameters to improve performance.

In additional examples, model evaluation 1308 can include a phase for evaluating the performance of a trained model (e.g., the trained machine-learning program 1402) on a separate testing dataset. This phase can help determine if the model is overfitting or underfitting and determine whether the model is suitable for deployment. Prediction 1310 can include a phase for using a trained model (e.g., trained machine-learning program 1402) to generate predictions on new, unseen data. Validation, refinement or retraining 1312 can include a phase for updating a model based on feedback generated from the prediction phase, such as new data or user feedback. Deployment 1314 can include a phase for integrating the trained model (e.g., the trained machine-learning program 1402) into a more extensive system or application, such as a web service, mobile app, or IoT device. This phase can involve setting up APIs, building a user interface, and ensuring that the model is scalable and can handle large volumes of data.

FIG. 14 illustrates further details of two example phases, namely a training phase 1404 (e.g., part of the model selection and training 1306) and a prediction phase 1410 (part of prediction 1310). Prior to the training phase 1404, feature engineering 1304 is used to identify features 1408. This may include identifying informative, discriminating, and independent features for effectively operating the trained machine-learning program 1402 in pattern recognition, classification, and regression. In some examples, the training data 1406 includes labeled data, known for pre-identified features 1408 and one or more outcomes. Each of the features 1408 may be a variable or attribute, such as an individual measurable property of a process, article, system, or phenomenon represented by a data set (e.g., the training data 1406). Features 1408 may also be of different types, such as numeric features, strings, and graphs, and may include one or more of content 1412, concepts 1414, attributes 1416, historical data 1418, and/or user data 1420, merely for example.

In training phase 1404, the machine-learning pipeline 1400 uses the training data 1406 to find correlations among the features 1408 that affect a predicted outcome or prediction/inference data 1422.

With the training data 1406 and the identified features 1408, the trained machine-learning program 1402 is trained during the training phase 1404 during machine-learning program training 1424. The machine-learning program training 1424 appraises values of the features 1408 as they correlate to the training data 1406. The result of the training is the trained machine-learning program 1402 (e.g., a trained or learned model).

Further, the training phase 1404 may involve machine learning, in which the training data 1406 is structured (e.g., labeled during preprocessing operations). The trained machine-learning program 1402 implements a neural network 1426 capable of performing, for example, classification and clustering operations. In other examples, the training phase 1404 may involve deep learning, in which the training data 1406 is unstructured, and the trained machine-learning program 1402 implements a deep neural network 1426 that can perform both feature extraction and classification/clustering operations.

In some examples, a neural network 1426 may be generated during the training phase 1404 and implemented within the trained machine-learning program 1402. The neural network 1426 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1426 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1426 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1404, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 1410, the trained machine-learning program 1402 uses the features 1408 for analyzing query data 1428 to generate inferences, outcomes, or predictions, as examples of a prediction/inference data 1422. For example, during prediction phase 1410, the trained machine-learning program 1402 generates an output. Query data 1428 is provided as an input to the trained machine-learning program 1402, and the trained machine-learning program 1402 generates the prediction/inference data 1422 as output, responsive to receipt of the query data 1428.

In some examples, the trained machine-learning program 1402 may be a generative AI model. Generative AI is a term that may refer to any type of artificial intelligence that can create new content from training data 1406. For example, generative AI can produce text, images, video, audio, code, or synthetic data similar to the original data but not identical.

Some of the techniques that may be used in generative AI are: Convolutional Neural Networks, Recurrent Neural Networks, generative adversarial networks, variational autoencoders, transformer models, and the like.

For example, Convolutional Neural Networks (CNNs) can be used for image recognition and computer vision tasks. CNNs may, for example, be designed to extract features from images by using filters or kernels that scan the input image and highlight important patterns. Recurrent Neural Networks (RNNs) can be used for processing sequential data, such as speech, text, and time series data, for example. RNNs employ feedback loops that allow them to capture temporal dependencies and remember past inputs. Generative adversarial networks (GANs) can include two neural networks: a generator and a discriminator. The generator network attempts to create realistic content that can "fool" the discriminator network, while the discriminator network attempts to distinguish between real and fake content. The generator and discriminator networks compete with each other and improve over time. Variational autoencoders (VAEs) can encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies. Transformer models can use attention mechanisms to learn the relationships between different parts of input data (such as words or pixels) and generate output data based on these relationships. Transformer models can handle sequential data, such as text or speech, as well as non-sequential data, such as images or code. In generative AI examples, the output prediction/inference data 1422 can include predictions, translations, summaries, media content, and the like, or some combination thereof.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, eXtensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a cloud data platform 102 can include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A cloud data platform 102 may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a cloud data platform 102, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

In the present disclosure, physical units of data that are stored in a cloud data platform—and that make up the content of, e.g., database tables in customer accounts (e.g., customer users)—are referred to as micro-partitions. In different implementations, a cloud data platform can store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the cloud data platform, a given file is referred to herein as an "internal file" and may be stored in (or at, or on, etc.) what is referred to herein as an "internal storage location." If stored external to the cloud data platform, a given file is referred to herein as an "external file" and is referred to as being stored in (or at, or on, etc.) what is referred to herein as an "external storage location."

While example embodiments of the present disclosure reference commands in the standardized syntax of the programming language Structured Query Language (SQL), it will be understood by one having ordinary skill in the art that the present disclosure can similarly apply to other programming languages associated with communicating and retrieving data from a database.

Described implementations of the subject matter can include one or more features, alone or in combination as illustrated below by way of example.

Example 1 is a method comprising: receiving results generated by a machine learning (ML) model, the results including at least one confidence score; enabling high selective prediction accuracy of the results generated by the ML model configured to perform document processing and understanding; implementing confidence scoring recalibration to address at least one challenge, the confidence scoring recalibration including functionality to assess reliability of the results generated by the ML model; and applying post-processing calibration to the at least one confidence score generated by the confidence scoring recalibration to enhance performance of the ML model, the post-processing calibration including adjusting the at least one confidence score generated by the confidence scoring recalibration.

In Example 2, the subject matter of Example 1 includes, utilizing selective prediction accuracy to improve the performance of the ML model, the selective prediction accuracy including the functionality to predict the accuracy of the results generated by the ML model; and improving both calibration quality and the selective prediction accuracy of the ML model performing the document processing and the understanding.

In Example 3, the subject matter of Examples 1-2 includes, identifying a quality of confidence score.

In Example 4, the subject matter of Example 3 includes, recalibrating the confidence score based on the quality of the confidence score; and applying a combination of temperature scaling, softmax denominator top-k probability selection, and polynomial regression to the confidence score.

In Example 5, the subject matter of Examples 1-4 includes, wherein the ML model is a pre-trained large language model.

In Example 6, the subject matter of Example 5 includes, generating one or more outputs from the pre-trained large language model; and applying the pre-trained large language model to make predictions on data not used for pre-training.

In Example 7, the subject matter of Example 6 includes, processing, by one or more hardware processor, a first set of electronic documents, using the pre-trained large language model, to extract a set of values for a set of data points for each of the first set of electronic documents; and recalibrating the at least one confidence score based on polynomial regression.

In Example 8, the subject matter of Example 7 includes, processing, by the ML model, a second set of electronic documents, including extracting one or more data points for each of the first set of electronic documents; providing a new confidence score solution including improving both calibration quality and selective prediction accuracy of the second set of electronic documents based on a combination of temperature scaling, top-k softmax denomination and recalibrating of the at least one confidence score of the first set of electronic documents; and indicating, by the ML model, confidence scores for one or more data point values extracted from the second set of electronic documents, when processed by the ML model for extraction.

In Example 9, the subject matter of Example 8 includes, a sequence of per-token logits including a series of numerical values that represent the predictions for each token in a sequence of electronic documents based on the ML model.

In Example 10, the subject matter of Example 9 includes, wherein logits include raw, unnormalized output of a neural network prior to application of a softmax function, and comprising: using the softmax function to convert the logits into probabilities, the logits providing a preliminary measurement of the at least one confidence score for the ML model.

Example 11 is a system comprising: one or more hardware processors of a machine; and at least one memory storing instructions that, when executed by the one or more hardware processors, cause the system to perform operations comprising: receiving results generated by a machine learning (ML) model, the results including at least one confidence score; enabling, by the one or more hardware processors, high selective prediction accuracy of the results generated by the ML model configured to perform document processing and understanding; implementing confidence scoring recalibration to address at least one challenge, the confidence scoring recalibration including functionality to assess reliability of the results generated by the ML model; and applying post-processing calibration to the at least one confidence score generated by the confidence scoring recalibration to enhance performance of the ML model, the post-processing calibration including adjusting the at least one confidence score generated by the confidence scoring recalibration.

In Example 12, the subject matter of Example 11 includes, the operation comprising: utilizing selective prediction accuracy to improve the performance of the ML model, the selective prediction accuracy including the functionality to predict the accuracy of the results generated by the ML model; and improving both calibration quality and the selective prediction accuracy of the ML model performing the document processing and the understanding.

In Example 13, the subject matter of Examples 11-12 includes, the operations comprising: identifying a quality of the at least one confidence score.

In Example 14, the subject matter of Example 13 includes, the operations comprising: recalibrating the at least one confidence score based on the quality of the at least one confidence score; and applying a combination of temperature scaling, softmax denominator top-k probability selection, and polynomial regression to the at least one confidence score.

In Example 15, the subject matter of Examples 11-14 includes, wherein the ML model is a pre-trained large language model.

In Example 16, the subject matter of Example 15 includes, the operations comprising: generating one or more outputs from the pre-trained large language model; and applying the pre-trained large language model to make predictions on data not used for pre-training.

In Example 17, the subject matter of Example 16 includes, wherein the operations comprise: processing, by one or more hardware processor, a first set of electronic documents, using the pre-trained large language model, to extract a set of values for a set of data points for each of the first set of electronic documents; and recalibrating the at least one confidence score based on polynomial regression.

In Example 18, the subject matter of Example 17 includes, wherein the operations comprise: processing, by the ML model, a second set of electronic documents, including extracting one or more data points for each of the first set of electronic documents; providing a new confidence score solution including improving both calibration quality and selective prediction accuracy of the second set of electronic documents based on a combination of temperature scaling, top-k softmax denomination and recalibrating of the at least one confidence score of the first set of electronic documents; and indicating, by the ML model, confidence scores for one or more data point values extracted from the second set of electronic documents, when processed by the ML model for extraction.

In Example 19, the subject matter of Example 18 includes, wherein the operations comprise: a sequence of per-token logits including a series of numerical values that represent the predictions for each token in a sequence of electronic documents based on the ML model.

In Example 20, the subject matter of Example 19 includes, wherein logits include raw, unnormalized output of a neural network prior to application of a softmax function, and comprising: using the softmax function to convert the logits into probabilities, the logits providing a preliminary measurement of the at least one confidence score for the ML model.

Example 21 is a machine-storage medium embodying instructions that, when executed by a machine, cause the machine to perform operations comprising: receiving results generated by a machine learning (ML) model, the results including at least one confidence score; enabling, by one or more hardware processors, high selective prediction accuracy of the results generated by the ML model configured to perform document processing and understanding; implementing confidence scoring recalibration to address at least one challenge, the confidence scoring recalibration including functionality to assess reliability of the results generated by the ML model; and applying post-processing calibration to the at least one confidence score generated by the confidence scoring recalibration to enhance performance of the ML model, the post-processing calibration including adjusting the at least one confidence score generated by the confidence scoring recalibration.

In Example 22, the subject matter of Example 21 includes, wherein the operations comprise: utilizing selective prediction accuracy to improve the performance of the ML model, the selective prediction accuracy including the functionality to predict the accuracy of the results generated by the ML model; and improving both calibration quality and the selective prediction accuracy of the ML model performing the document processing and the understanding.

In Example 23, the subject matter of Examples 21-22 includes, wherein the operations comprise: identifying a quality of confidence score.

In Example 24, the subject matter of Example 23 includes, wherein the operations comprise: recalibrating the confidence score based on the quality of the confidence score; and applying a combination of temperature scaling, softmax denominator top-k probability selection, and polynomial regression to the confidence score.

In Example 25, the subject matter of Examples 21-24 includes, wherein the ML model is a pre-trained large language model.

In Example 26, the subject matter of Example 25 includes, wherein the operations comprise: generating one or more outputs from the pre-trained large language model; and applying the pre-trained large language model to make predictions on data not used for pre-training.

In Example 27, the subject matter of Example 26 includes, wherein the operations comprise: processing, by one or more hardware processor, a first set of electronic documents, using the pre-trained large language model, to extract a set of values for a set of data points for each of the first set of electronic documents; and recalibrating the at least one confidence score based on polynomial regression.

In Example 28, the subject matter of Example 27 includes, wherein the operations comprise: processing, by the ML model, a second set of electronic documents, including extracting one or more data points for each of the first set of electronic documents; providing a new confidence score solution including improving both calibration quality and selective prediction accuracy of the second set of electronic documents based on a combination of temperature scaling, top-k softmax denomination and recalibrating of the at least one confidence score of the first set of electronic documents; and indicating, by the ML model, confidence scores for one or more data point values extracted from the second set of electronic documents, when processed by the ML model for extraction.

In Example 29, the subject matter of Example 28 includes, wherein the operations comprise: a sequence of per-token logits including a series of numerical values that represent the predictions for each token in a sequence of electronic documents based on the ML model.

In Example 30, the subject matter of Example 29 includes, wherein logits include raw, unnormalized output of a neural network prior to application of a softmax function, and comprising: using the softmax function to convert the logits into probabilities, the logits providing a preliminary measurement of the at least one confidence score for the ML model.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Figure 15:
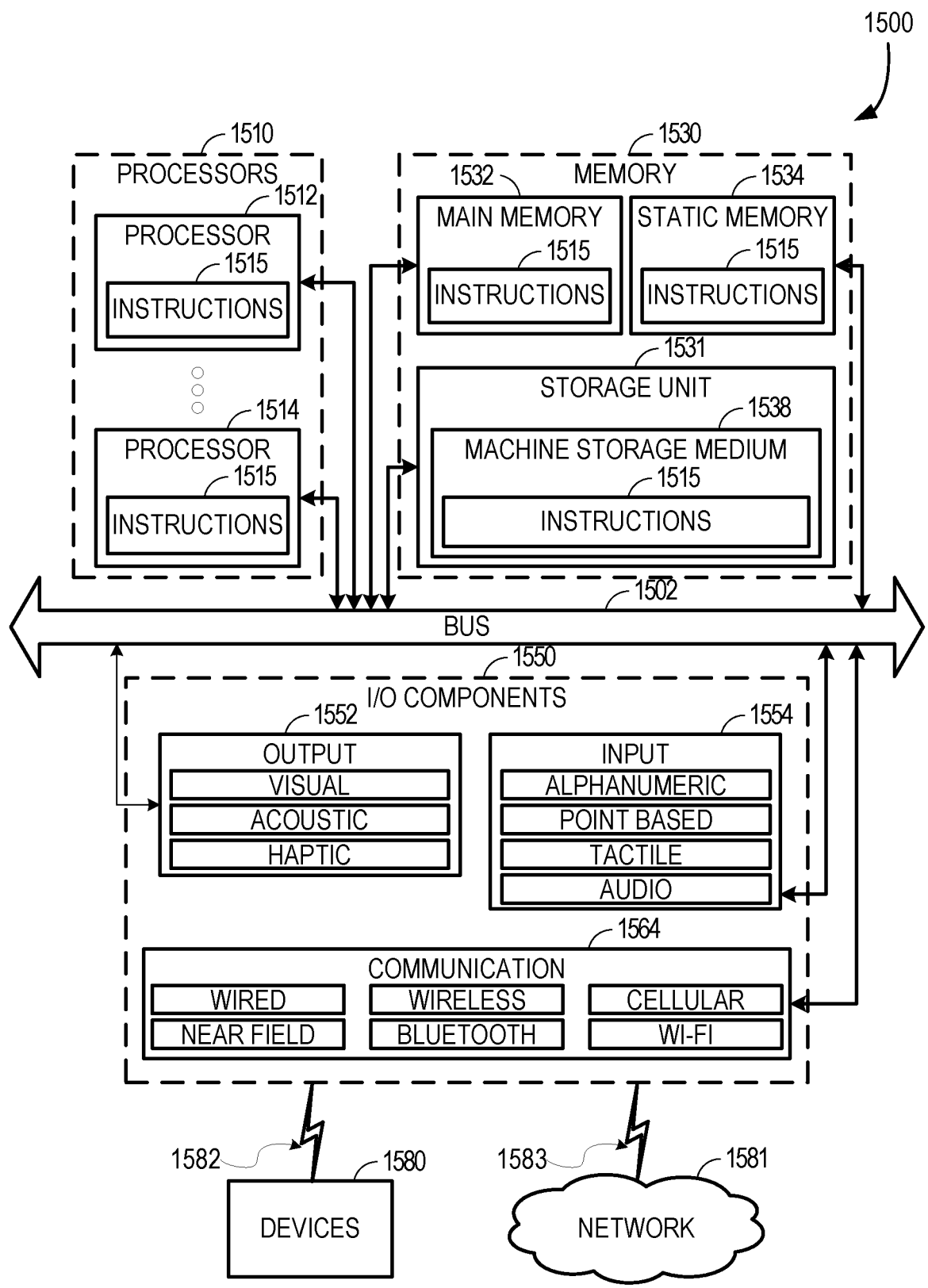
FIG. 15 illustrates an example diagrammatic representation of a machine in the form of a computer system within which a set of instructions may be executed for causing the machine to perform any one or more of the methodologies discussed herein, according to some example embodiments.

FIG. 15 illustrates a diagrammatic representation of a machine 1500 in the form of a computer system within which a set of instructions may be executed for causing the machine 1500 to perform any one or more of the methodologies discussed herein, according to an example embodiment. Specifically, FIG. 15 shows a diagrammatic representation of the machine 1500 in the example form of a computer system, within which instructions 1515 (e.g., software, a program, an application, an applet, an app, or other executable code), for causing the machine 1500 to perform any one or more of the methodologies discussed herein, may be executed. For example, the instructions 1515 may cause the machine 1500 to implement portions of the data flows described herein (e.g., data flows described and depicted in FIG. 12). In this way, the instructions 1515 transform a general, non-programmed machine into a particular machine 1500 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1515, sequentially or otherwise, that specify actions to be taken by the machine 1500. Further, while only a single machine 1500 is illustrated, the term "machine" shall also be taken to include a collection of machines 1500 that individually or jointly execute the instructions 1515 to perform any one or more of the methodologies discussed herein.

The machine 1500 includes processors 1510, memory 1530, and input/output (I/O) components 1550 configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1515. The term "processor" is intended to include multi-core processors 1510 that may comprise two or more independent processors (sometimes referred to as "cores") that may execute instructions 1515 contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1531, all accessible to the processors 1510 such as via the bus 1502. The main memory 1532, the static memory 1534, and the storage unit 1531 comprise a machine storage medium 1538 that may store the instructions 1515 embodying any one or more of the methodologies or functions described herein. The instructions 1515 may also reside, completely or partially, within the main memory 1532, within the static memory 1534, within the storage unit 1531, within at least one of the processors 1510 (e.g., within the processor's cache memory), or any suitable combination thereof, during execution thereof by the machine 1500.

The I/O components 1550 include components to receive input, provide output, produce output, transmit information, exchange information, capture measurements, and so on. The specific I/O components 1550 that are included in a particular machine 1500 will depend on the type of machine. For example, portable machines, such as mobile phones, will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1550 may include communication components 1564 operable to couple the machine 1500 to a network 1581 via a coupler 1583 or to devices 1580 via a coupling 1582. For example, the communication components 1564 may include a network interface component or another suitable device to interface with the network 1581. In further examples, the communication components 1564 may include wired communication components, wireless communication components, cellular communication components, and other communication components to provide communication via other modalities. The devices 1580 may be another machine or any of a wide variety of peripheral devices (e.g., a peripheral device coupled via a universal serial bus (USB)). For example, as noted above, the machine 1500 may correspond to any one of the client device 114, the compute service manager 108, and the execution platform 110, and may include any other of these systems and devices.

The various memories (e.g., 1530, 1532, 1534, and/or memory of the processor(s) 1510 and/or the storage unit 1531) may store one or more sets of instructions 1515 and data structures (e.g., software), embodying or utilized by any one or more of the methodologies or functions described herein. These instructions 1515, when executed by the processor(s) 1510, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1581 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1581 or a portion of the network 1581 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1515 may be transmitted or received over the network 1581 using a transmission medium via a network interface device (e.g., a network interface component included in the communication components 1564) and utilizing any one of a number of well-known transfer protocols (e.g., hypertext transfer protocol (HTTP)). Similarly, the instructions 1515 may be transmitted or received using a transmission medium via the coupling 1582 (e.g., a peer-to-peer coupling) to the devices 1580. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1515 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A method comprising:
receiving, by at least one hardware processor, results generated by a machine learning (ML) model, the results including at least one confidence score;
enabling high selective prediction accuracy of the results generated by the ML model configured to perform document processing and understanding of an electronic text document;
implementing confidence scoring recalibration to address at least one challenge, the confidence scoring recalibration including functionality to assess reliability of the results generated by the ML model;
applying post-processing calibration to the at least one confidence score generated by the confidence scoring recalibration to enhance performance of the ML model, the post-processing calibration including adjusting the at least one confidence score generated by the confidence scoring recalibration;
based on the adjusting of the at least one confidence score, extracting individual elements of information from the electronic text document, the extracted individual elements of the information including one or more extracted values; and
storing the one or more extracted values in a database including an adjusted confidence score associated with each of the one or more extracted values and the results generated by a ML model.

2. The method of claim 1, comprising:
utilizing selective prediction accuracy to improve the performance of the ML model, the selective prediction accuracy including the functionality to predict an accuracy of the results generated by the ML model; and
improving both calibration quality and the selective prediction accuracy of the ML model performing the document processing and the understanding.

3. The method of claim 1, comprising:
identifying a quality of confidence score.

4. The method of claim 3, comprising:
recalibrating the confidence score based on the quality of the confidence score; and
applying a combination of temperature scaling, softmax denominator top-k probability selection, and polynomial regression to the confidence score.

5. The method of claim 1, wherein the ML model is a pre-trained large language model.

6. The method of claim 5, comprising:
generating one or more outputs from the pre-trained large language model; and
applying the pre-trained large language model to make predictions on data not used for pre-training.

7. The method of claim 6, comprising:
processing, by one or more hardware processor, a first set of electronic documents, using the pre-trained large language model, to extract a set of values for a set of data points for each of the first set of electronic documents; and
recalibrating the at least one confidence score based on polynomial regression.

8. The method of claim 7, comprising:
processing, by the ML model, a second set of electronic documents, including extracting one or more data points for each of the first set of electronic documents;
providing a new confidence score solution including improving both calibration quality and selective prediction accuracy of the second set of electronic documents based on a combination of temperature scaling, top-k softmax denomination and recalibrating of the at least one confidence score of the first set of electronic documents; and
indicating, by the ML model, confidence scores for one or more data point values extracted from the second set of electronic documents, when processed by the ML model for extraction.

9. The method of claim 8, comprising:
a sequence of per-token logits including a series of numerical values that represent the predictions for each token in a sequence of electronic documents based on the ML model.

10. The method of claim 9, wherein logits include raw, unnormalized output of a neural network prior to application of a softmax function, and comprising:
using the softmax function to convert the logits into probabilities, the logits providing a preliminary measurement of the at least one confidence score for the ML model.

11. A system comprising:
one or more hardware processors of a machine; and
at least one memory storing instructions that, when executed by the one or more hardware processors, cause the system to perform operations comprising:
receiving, by at least one hardware processor, results generated by a machine learning (ML) model, the results including at least one confidence score;
enabling high selective prediction accuracy of the results generated by the ML model configured to perform document processing and understanding of an electronic text document;
implementing confidence scoring recalibration to address at least one challenge, the confidence scoring recalibration including functionality to assess reliability of the results generated by the ML model;
applying post-processing calibration to the at least one confidence score generated by the confidence scoring recalibration to enhance performance of the ML model, the post-processing calibration including adjusting the at least one confidence score generated by the confidence scoring recalibration;
based on the adjusting of the at least one confidence score, extracting individual elements of information from the electronic text document, the extracted individual elements of the information including one or more extracted values; and
storing the one or more extracted values in a database including an adjusted confidence score associated with each of the one or more extracted values and the results generated by a ML model.

12. The system of claim 11, the operations comprising:
utilizing selective prediction accuracy to improve the performance of the ML model, the selective prediction accuracy including the functionality to predict an accuracy of the results generated by the ML model; and
improving both calibration quality and the selective prediction accuracy of the ML model performing the document processing and the understanding.

13. The system of claim 11, the operations comprising:
identifying a quality of the at least one confidence score.

14. The system of claim 13, the operations comprising:
recalibrating the at least one confidence score based on the quality of the at least one confidence score; and
applying a combination of temperature scaling, softmax denominator top-k probability selection, and polynomial regression to the at least one confidence score.

15. The system of claim 11, wherein the ML model is a pre-trained large language model.

16. The system of claim 15, the operations comprising:
generating one or more outputs from the pre-trained large language model; and
applying the pre-trained large language model to make predictions on data not used for pre-training.

17. The system of claim 16, wherein the operations comprise:
processing, by one or more hardware processor, a first set of electronic documents, using the pre-trained large language model, to extract a set of values for a set of data points for each of the first set of electronic documents; and
recalibrating the at least one confidence score based on polynomial regression.

18. The system of claim 17, wherein the operations comprise:
processing, by the ML model, a second set of electronic documents, including extracting one or more data points for each of the first set of electronic documents;
providing a new confidence score solution including improving both calibration quality and selective prediction accuracy of the second set of electronic documents based on a combination of temperature scaling, top-k softmax denomination and recalibrating of the at least one confidence score of the first set of electronic documents; and
indicating, by the ML model, confidence scores for one or more data point values extracted from the second set of electronic documents, when processed by the ML model for extraction.

19. The system of claim 18, wherein the operations comprise:
a sequence of per-token logits including a series of numerical values that represent the predictions for each token in a sequence of electronic documents based on the ML model.

20. The system of claim 19, wherein logits include raw, unnormalized output of a neural network prior to application of a softmax function, and comprising:
using the softmax function to convert the logits into probabilities, the logits providing a preliminary measurement of the at least one confidence score for the ML model.

21. A machine-storage medium embodying instructions that, when executed by a machine, cause the machine to perform operations comprising:
receiving, by at least one hardware processor, results generated by a machine learning (ML) model, the results including at least one confidence score;
enabling high selective prediction accuracy of the results generated by the ML model configured to perform document processing and understanding of an electronic text document;
implementing confidence scoring recalibration to address at least one challenge, the confidence scoring recalibration including functionality to assess reliability of the results generated by the ML model;
applying post-processing calibration to the at least one confidence score generated by the confidence scoring recalibration to enhance performance of the ML model, the post-processing calibration including adjusting the at least one confidence score generated by the confidence scoring recalibration;
based on the adjusting of the at least one confidence score, extracting individual elements of information from the electronic text document, the extracted individual elements of the information including one or more extracted values; and
storing the one or more extracted values in a database including an adjusted confidence score associated with each of the one or more extracted values and the results generated by a ML model.

22. The machine-storage medium of claim 21, wherein the operations comprise:
   utilizing selective prediction accuracy to improve the performance of the ML model, the selective prediction accuracy including the functionality to predict an accuracy of the results generated by the ML model; and
   improving both calibration quality and the selective prediction accuracy of the ML model performing the document processing and the understanding.

23. The machine-storage medium of claim 21, wherein the operations comprise:
   identifying a quality of confidence score.

24. The machine-storage medium of claim 23, wherein the operations comprise:
   recalibrating the confidence score based on the quality of the confidence score; and
   applying a combination of temperature scaling, softmax denominator top-k probability selection, and polynomial regression to the confidence score.

25. The machine-storage medium of claim 21, wherein the ML model is a pre-trained large language model.

26. The machine-storage medium of claim 25, wherein the operations comprise:
   generating one or more outputs from the pre-trained large language model; and
   applying the pre-trained large language model to make predictions on data not used for pre-training.

27. The machine-storage medium of claim 26, wherein the operations comprise:
   processing, by one or more hardware processor, a first set of electronic documents, using the pre-trained large language model, to extract a set of values for a set of data points for each of the first set of electronic documents; and
   recalibrating the at least one confidence score based on polynomial regression.

28. The machine-storage medium of claim 27, wherein the operations comprise:
   processing, by the ML model, a second set of electronic documents, including extracting one or more data points for each of the first set of electronic documents;
   providing a new confidence score solution including improving both calibration quality and selective prediction accuracy of the second set of electronic documents based on a combination of temperature scaling, top-k softmax denomination and recalibrating of the at least one confidence score of the first set of electronic documents; and
   indicating, by the ML model, confidence scores for one or more data point values extracted from the second set of electronic documents, when processed by the ML model for extraction.

29. The machine-storage medium of claim 28, wherein the operations comprise:
   a sequence of per-token logits including a series of numerical values that represent the predictions for each token in a sequence of electronic documents based on the ML model.

30. The machine-storage medium of claim 29, wherein logits include raw, unnormalized output of a neural network prior to application of a softmax function, and comprising:
   using the softmax function to convert the logits into probabilities, the logits providing a preliminary measurement of the at least one confidence score for the ML model.

* * * * *